(12) United States Patent
Allen et al.

(10) Patent No.: US 12,368,664 B2
(45) Date of Patent: Jul. 22, 2025

(54) SYSTEM AND METHOD FOR THE AUTOMATIC ROUTING OF INFORMATION IN DYNAMIC NETWORKS

(71) Applicant: Incucomm, Inc., Addison, TX (US)

(72) Inventors: Randal Allen, Orlando, FL (US); Eric Haney, Dallas, TX (US); Mark James Volpi, Wylie, TX (US)

(73) Assignee: INCUCOMM, INC., Addison, TX (US)

( * ) Notice: Subject to any disclaimer, the term of this patent is extended or adjusted under 35 U.S.C. 154(b) by 334 days.

(21) Appl. No.: 17/818,965

(22) Filed: Aug. 10, 2022

(65) Prior Publication Data

US 2023/0129641 A1    Apr. 27, 2023

Related U.S. Application Data

(63) Continuation-in-part of application No. 17/305,803, filed on Jul. 14, 2021, now abandoned.

(60) Provisional application No. 63/260,137, filed on Aug. 10, 2021, provisional application No. 62/705,753, filed on Jul. 14, 2020.

(51) Int. Cl.
*H04L 12/66* (2006.01)
*H04L 45/00* (2022.01)
*H04W 40/20* (2009.01)

(52) U.S. Cl.
CPC ............ *H04L 45/14* (2013.01); *H04W 40/20* (2013.01)

(58) Field of Classification Search
CPC ....... H04L 45/12; H04L 45/123; H04L 45/38; H04L 45/04; H04L 47/10; H04L 45/14; H04L 67/101; H04L 45/42; H04L 45/24; H04L 2012/562; H04L 2012/5623; H04L 41/0806; H04L 43/026
See application file for complete search history.

(56) References Cited

U.S. PATENT DOCUMENTS

| | | | |
|---|---|---|---|
| 2003/0048750 A1* | 3/2003 | Kobayashi | H04L 45/42 370/237 |
| 2008/0259809 A1* | 10/2008 | Stephan | H04L 45/26 370/252 |
| 2016/0059855 A1* | 3/2016 | Rebhan | B60W 30/095 701/41 |

OTHER PUBLICATIONS

Robert Daily, Harmonic Potential Field Path Planning for High Speed Vehicles, Jun. 2008, American Control Conference, 4609-4614 (Year: 2008).*

(Continued)

*Primary Examiner* — Kharye Pope
(74) *Attorney, Agent, or Firm* — Boisbrun Hofman, PLLC

(57) ABSTRACT

Systems and methods for the automatic routing of data packets in dynamic networks, wherein at least a portion of a route for a data packet is modeled as a fluid dynamics potential flow characterized by an irrotational velocity field. Each data packet is the analogue of a flow particle, an originating node of the data packet is the analogue of a source, and a destination node of the data packet is the analogue of a sink. Each of one or more nodes intermediate to the originating node and the destination node for a data packet are defined as a stream function ($\Psi$) which adheres to the definition of irrotational and incompressible potential flow that independently represents a flow phenomenon that can influence the route of the data packet. A route for a data packet is calculated based on its current location and the aggregate stream function comprising the sum of each of the flow phenomena acting on the data packet.

36 Claims, 14 Drawing Sheets

(56) References Cited

OTHER PUBLICATIONS

Stephen Waydo, Vehicle Motion Planning Using Stream Functions, Proceedings of the 2003 IEEE, Sep. 2003, 2484-2491 (Year: 2003).*

* cited by examiner

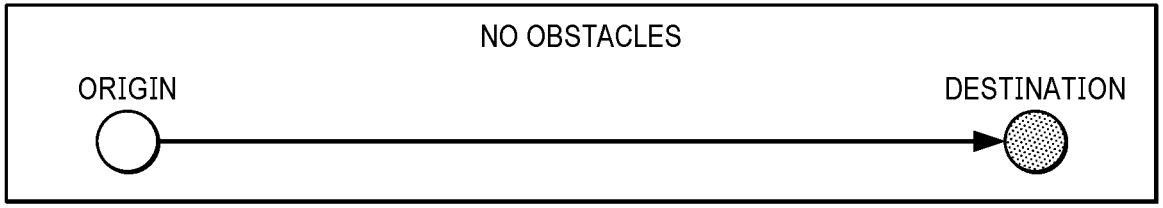
FIGURE 1-A
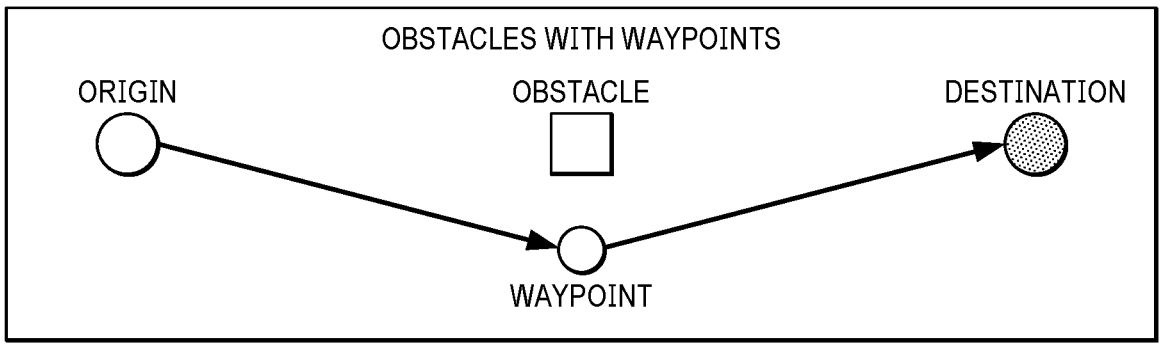
FIGURE 1-B
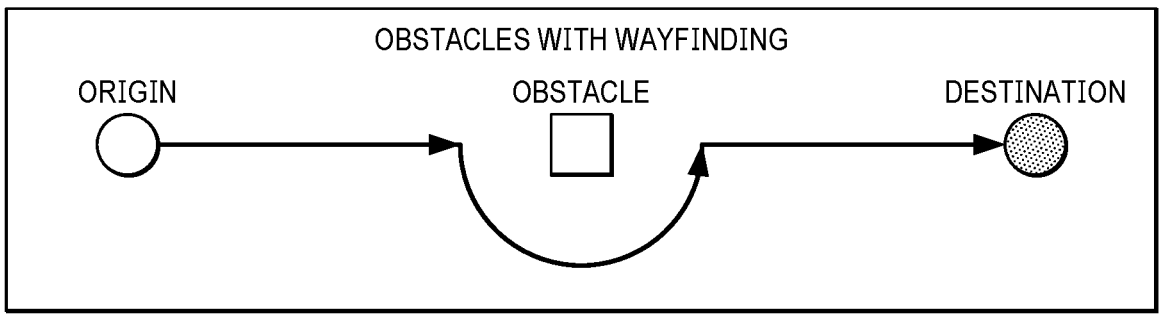
FIGURE 1-C

FIGURE 2
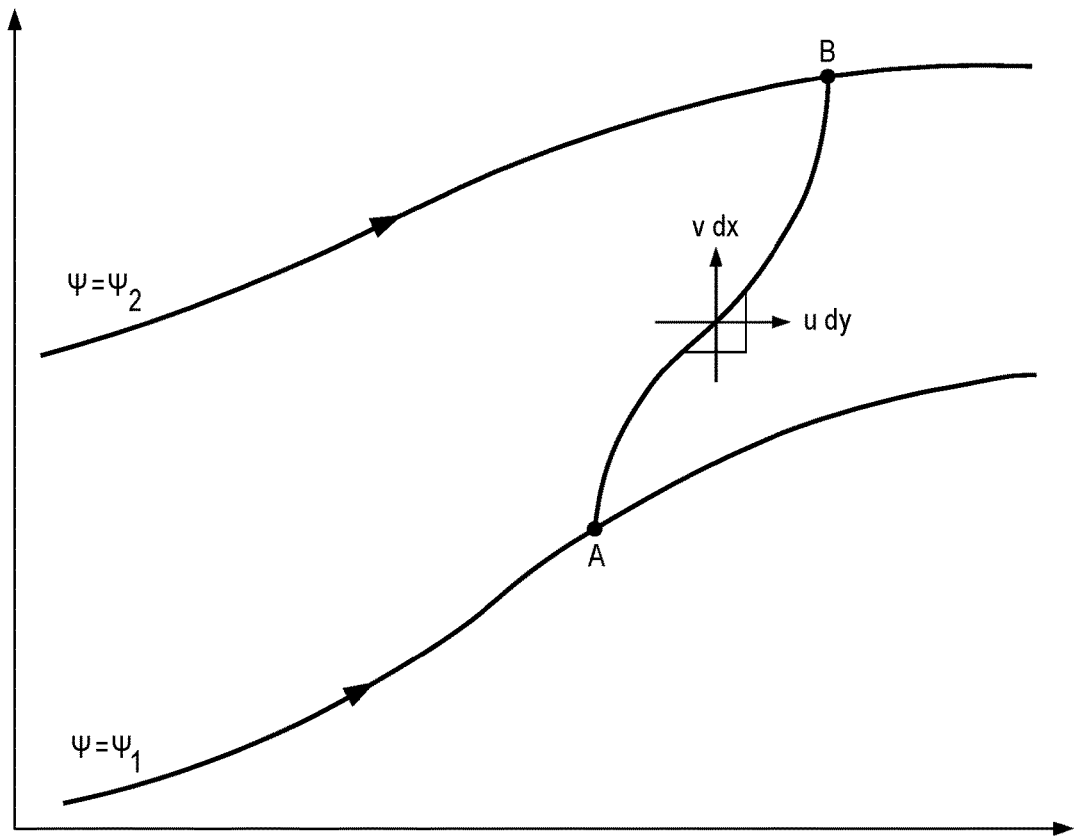
FIGURE 3-A
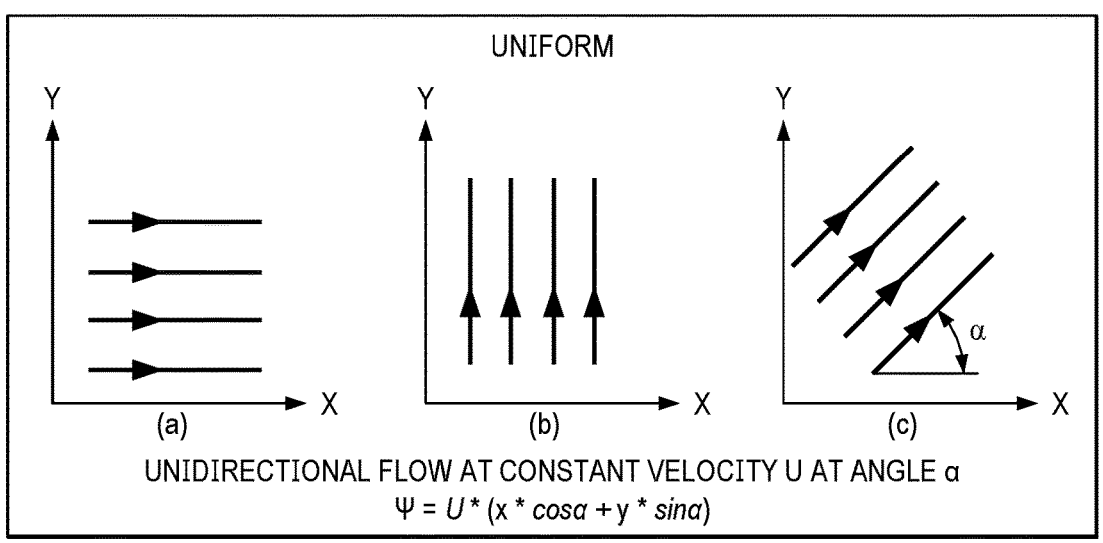

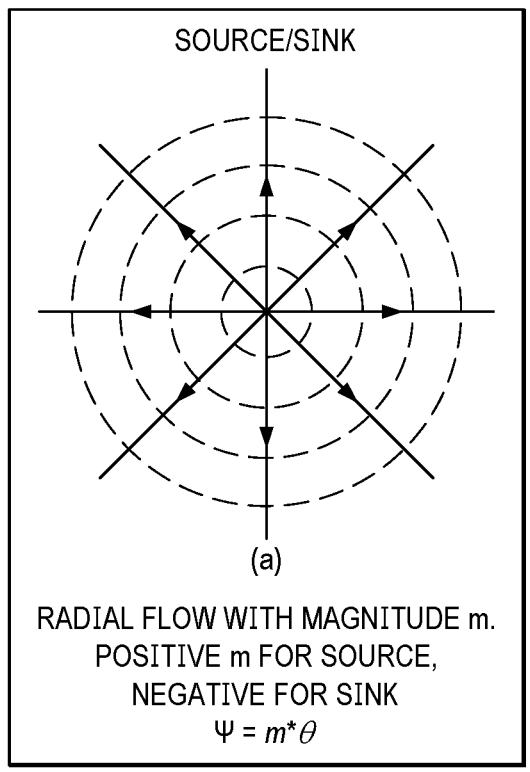
FIGURE 3-B
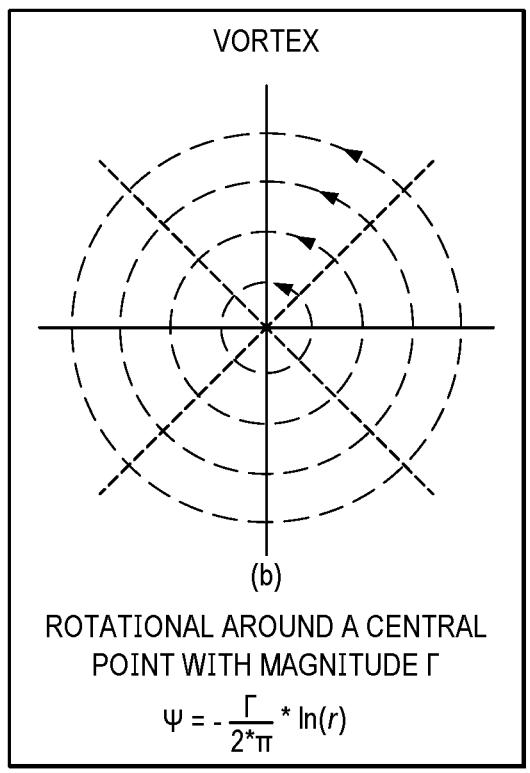
FIGURE 3-C

FIGURE 3-D
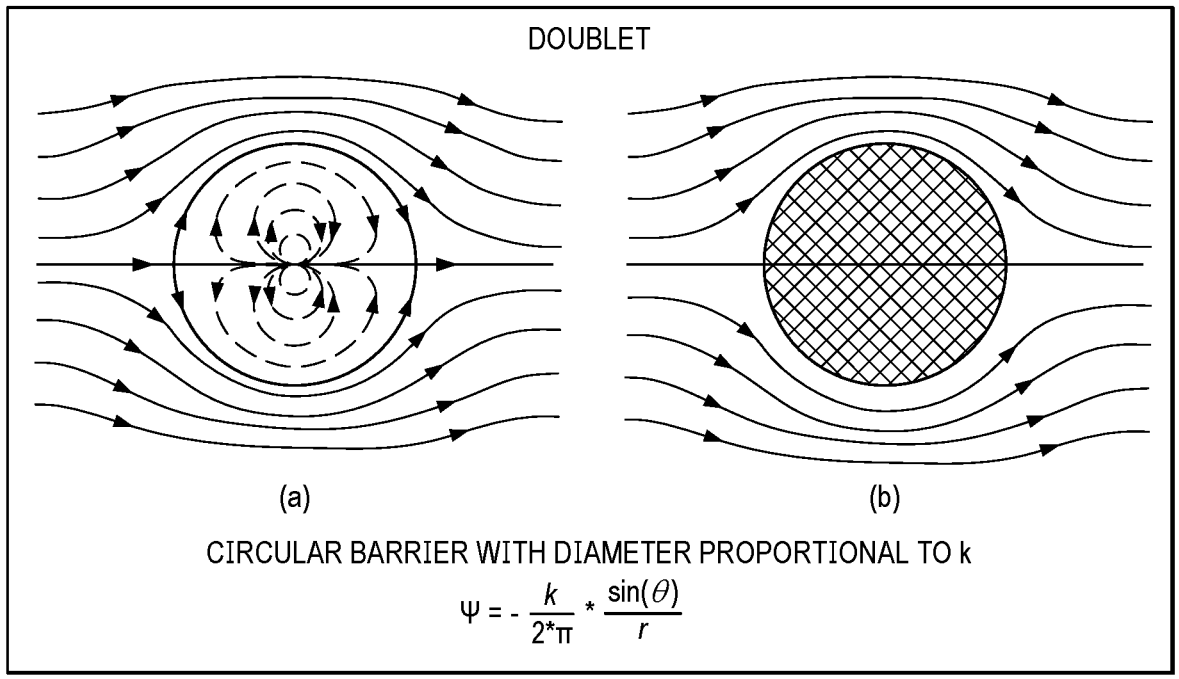
DOUBLET
(a)   (b)
CIRCULAR BARRIER WITH DIAMETER PROPORTIONAL TO k
$$\Psi = -\frac{k}{2*\pi} * \frac{\sin(\theta)}{r}$$
FIGURE 3-E
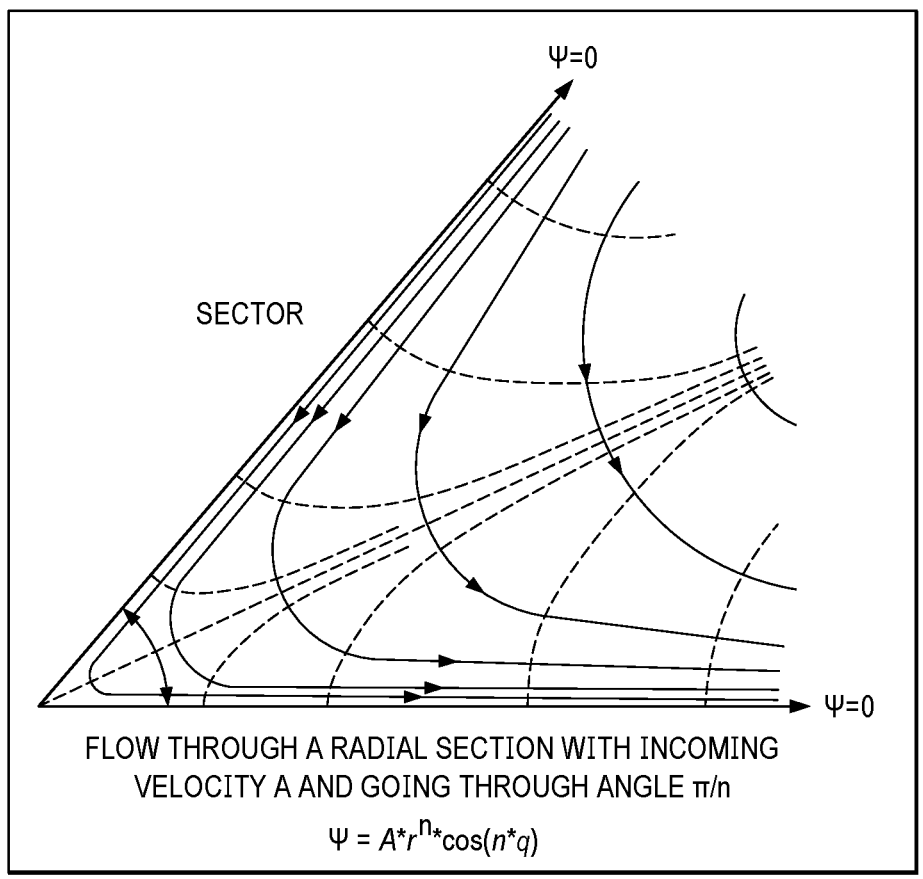
SECTOR
FLOW THROUGH A RADIAL SECTION WITH INCOMING VELOCITY A AND GOING THROUGH ANGLE π/n
$$\Psi = A*r^n*\cos(n*q)$$

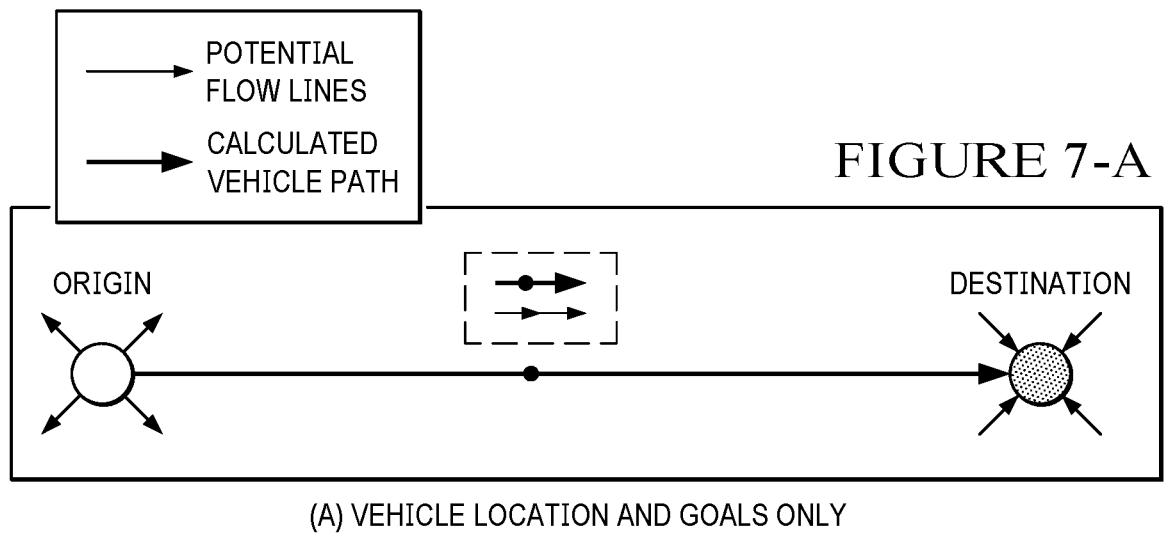
FIGURE 7-A
(A) VEHICLE LOCATION AND GOALS ONLY
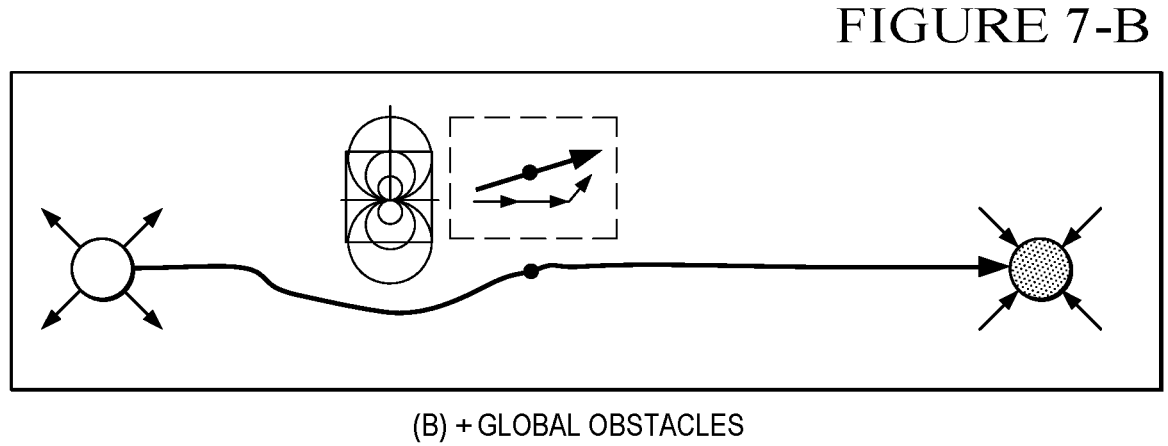
FIGURE 7-B
(B) + GLOBAL OBSTACLES
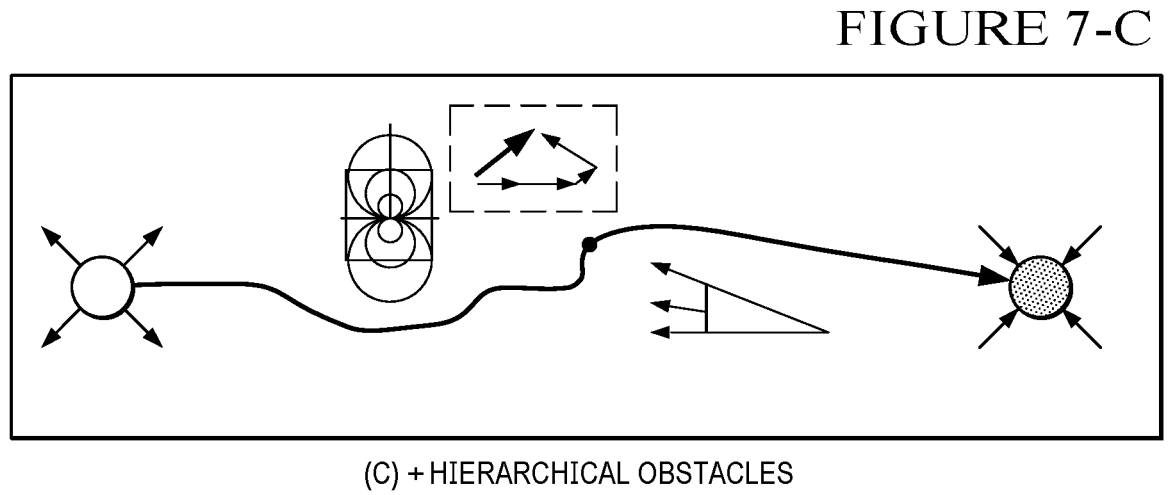
FIGURE 7-C
(C) + HIERARCHICAL OBSTACLES

SYSTEM AND METHOD FOR THE AUTOMATIC ROUTING OF INFORMATION IN DYNAMIC NETWORKS

RELATED APPLICATIONS

This application claims priority from and to U.S. Provisional Patent Application No. 63/260,137, filed on Aug. 10, 2021, and entitled Wayfinding for Data Transfer, and is a continuation-in-part of U.S. patent application Ser. No. 17/305,803, filed on Jul. 14, 2021, entitled System and Method for the Automatic Routing of At-Least-Partially Autonomous Vehicles, which claims priority to U.S. Provisional Patent Application No. 62/705,753, filed on Jul. 14, 2020, each of which is incorporated herein by reference.

TECHNICAL FIELD OF THE DISCLOSURE

The present disclosure is directed, in general, to communications networks and, more specifically, to automatic routing of information in dynamic networks.

BACKGROUND

Several use cases exist where information needs to be moved within a network between its source location to one or more destination locations through an uncertain and dynamic series of intermediate nodes. Within such use cases, each transmission node may only have visibility into immediately adjacent nodes or into a subset of the surrounding area. Common routing systems do not provide the flexibility to adjust to heterogenous node types, heterogenous information packet priority, and restricted network visibility. Therefore, what is needed is a system which dynamically adjusts route planning of information within a network based on real-time conditions of the network environment.

SUMMARY

In order to address deficiencies in the prior art, disclosed are systems and methods for the automatic routing of data packets in dynamic networks, wherein at least a portion of a route for a data packet is modeled as a fluid dynamics potential flow characterized by an irrotational velocity field. According to the methodology, each data packet is the analogue of a flow particle, an originating node of the data packet is the analogue of a source, and a destination node of the data packet is the analogue of a sink. Each of one or more nodes intermediate to the originating node and the destination node for a data packet are defined as a stream function ($\Psi$) which adheres to the definition of irrotational and incompressible potential flow that independently represents a flow phenomenon that can influence the route of the data packet. A route for a data packet is calculated based on its current location and the aggregate stream function comprising the sum of each of the flow phenomena acting on the data packet.

BRIEF DESCRIPTION OF THE DRAWINGS

FIG. 1-A illustrates a route with no obstacles;
FIG. 1-B illustrates a route with an obstacle and a waypoint to avoid the obstacle;
FIG. 1-C illustrates a route with an obstacle and a wayfinding path to avoid the obstacle according to the principles of the invention;
FIG. 2 illustrates the concept of potential flow;
FIGS. 3-A, 3-B, 3-C, 3-D and 3-E illustrate different phenomena in accordance with the concept of potential flow;
FIGS. 7-A, 7-B and 7-C illustrate a wayfinding path of a vehicle, according to the principles of the invention, for no obstacles, global obstacles, and hierarchical obstacles, respectively.

DETAILED DESCRIPTION

Figure 4:
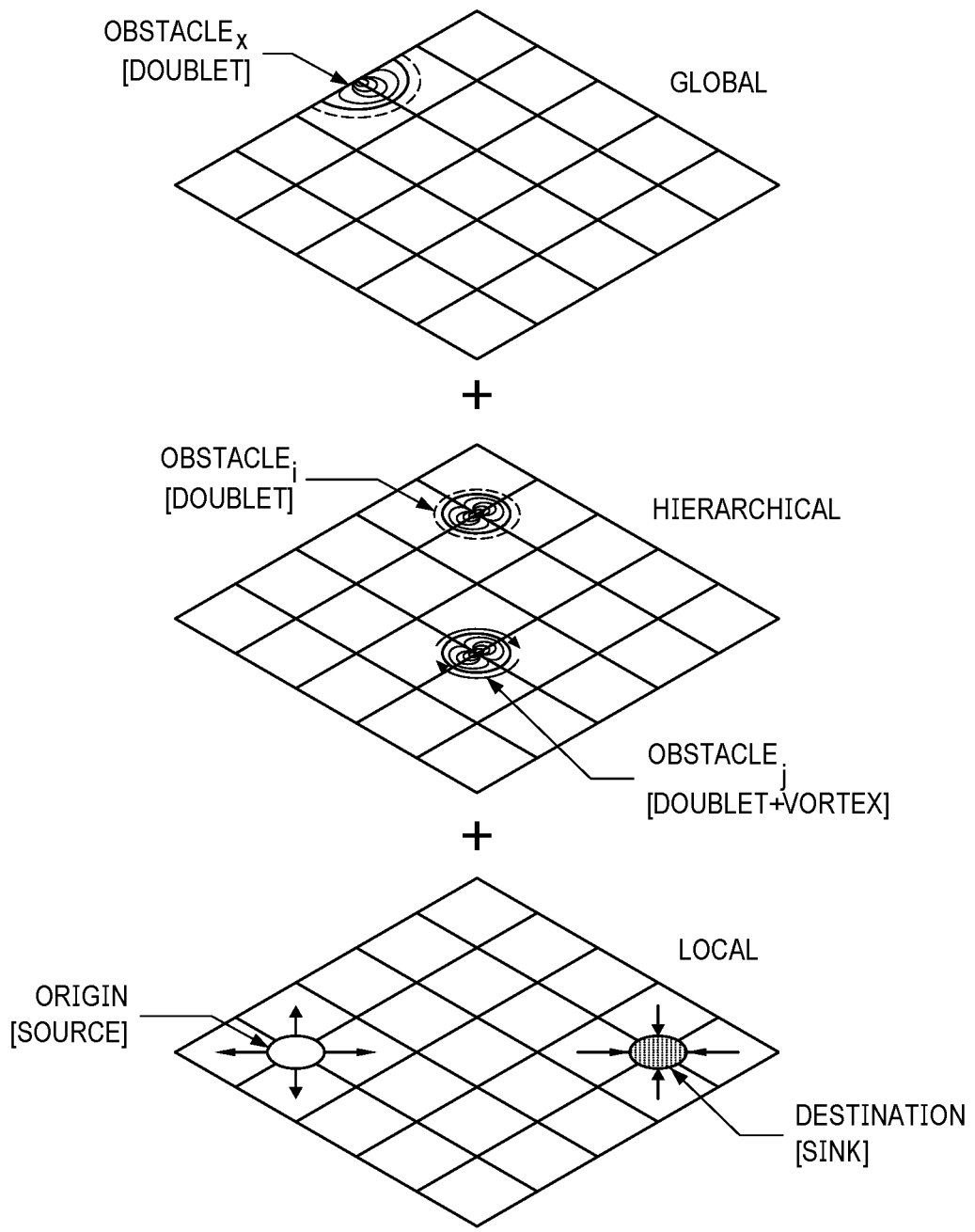
FIG. 4 illustrate a hierarchy for classifying obstacles.

Route planning can broadly be broken into two categories. The first category, as illustrated in FIG. 1-A, is unconstrained route planning which is not subject to obstacles or restrictions on the route, vehicle or environment; the route is only defined by the origination and destination and a route can be obtained through any number of means known to those skilled in the art. In order to solve the more practical problem of route planning once obstacles or intermediate destinations (i.e., constraints) are introduced, waypoints have traditionally been introduced as depicted in FIG. 1-B; waypoints define one or more locations intermediate to the origin and destination suitable to route a vehicle around an obstacle, which can require human intervention. While this approach is reasonable if a small number of paths are being planned and/or a small number of obstacles must be considered, this approach does not provide a scalable solution for large, complex, and/or dynamic vehicle networks without substantial manpower.

Rather than the use of conventional waypoints, "wayfinding" (at least for the purposes of the invention disclosed herein) is a means by which the source(s), obstacle(s), and destination(s) are themselves used to systematically calculate a path as depicted in FIG. 1-C. This method also be thought of as the numeric definition of an infinite number of waypoints that satisfy some series of constrained requirements. It is such wayfinding to which the principles of the disclosed invention are directed—that is, the automated estimation of a wayfinding path for one or more vehicles in a real-time network of vehicles.

A preferable solution to the wayfinding problem should satisfy certain practical realities:
the solution should be scalable for a plurality of vehicles (at least several hundred, and potentially thousands) within a limited geographic region;

the solution should incorporate the context of the operating environment that can vary geospatially and with time;

the solution should reflect the authority or influence of outside entities; e.g., other vehicles in the network, organizations that govern vehicle space, non-vehicle obstacles that must be accounted for; and, the solution should be able to re-adjust a wayfinding estimation on a time interval that is reflective of the speed of the vehicle (e.g., seconds for most use-cases and potentially sub-second for fast-moving vehicles in dynamic environments).

Ideally, the solution would also limit the need for high-bandwidth communication between a centralized control network or with other vehicles. While limits on network throughput may be alleviated to some degree with new and emerging communications standards (e.g., 5G telecommunications or NextGen air traffic control), a solution that reduces reliance on these other technologies has benefits from a cost and dependency standpoint and extends its applicability to commercial and military use cases where networks are limited, expensive, or actively denied.

Due to the identified practical realities, obvious solutions such as physics-based engineering simulation, mathematical optimization of the total vehicle network, a traveling salesman-inspired system and a neural network of vehicle paths, among other potential solutions, are likely deficient. A more robust, compact, and computationally efficient solution is thus required. The potential adaptation of current status quo solutions—such as human-in-the-loop routing or designated path channels—are also limited in usefulness compared to the proposed solution. For example, coordinated air traffic control does not provide the scale nor speed; remotely piloted vehicles require a large, stable and secure bandwidth; and wholly dedicated traffic lanes do not account for dynamic environments.

To address the deficiencies of the prior art, it has been recognized that there exists a known approach in fluid dynamics called "potential flow" which takes a highly challenging series of partial differential equations which govern fluid flow and makes assumptions that allow for simple algebraic solutions; the application of such fluid dynamics principles to a vehicle traveling through the atmosphere is a common basis for considering incompressible aerodynamic flow around a given shape. This approach allows for separation of analyses: potential flow used for streamline and pressure forces, and more complex boundary layer analysis used for friction forces, the combination of which can be solved in sequence relatively easily—where a unified solution (e.g., full Navier-Stokes analysis) would be burdensome even with advanced computational resources. The key benefit is that by assuming the simplifying assumption that the flow is irrotational and inviscid several closed form solutions exist for different flow phenomena as enumerated in Table 1 (below) and described hereinafter with reference to FIG. 3.

First, referring to FIG. 2, illustrated is the concept of potential flow, wherein streamlines (the path a fluid particle will take in the flow field) are those lines with constant values of the stream function $\psi$; two streamlines are illustrated, $\psi_1$ and $\psi_2$. Connecting points within the flow are equipotential lines of constant potential $\phi$—these lines are orthogonal (have slopes equal to the negative reciprocal) of the stream function; one such equipotential line between points A and B is illustrated. The integration of the velocity components (u and v) along a line of constant potential produces the overall volumetric flow rate. This allows the conservation of mass to be enforced and the mathematical definitions of potential $\phi$ and stream function $\psi$ to be linked.

Next, referring to FIGS. 3-A, 3-B, 3-C, 3-D and 3-E, illustrated are different phenomena in accordance with the concept of potential flow, including uniform flow, source and sink flows, vortex flow, doublet flow, and sector flow. The potential flow solutions are written in terms of $\psi$ which is the stream function that independently represents each flow phenomena. Components may be represented in either Cartesian or polar coordinates and may also be translated to relative origin points. Streamlines, or paths on which a particle would flow through the given flow pattern, can be derived by holding an aggregate stream function constant.

TABLE 1

| Phenomena | Description | Formula |
| --- | --- | --- |
| Uniform Flow | Unidirectional flow at constant velocity U | $\Psi = U * y$ |
| Source | Radial flow with magnitude m | $\Psi = m * \theta$ |
| Sink | Radial flow with magnitude negative m | $\Psi = m * \theta$ |
| Vortex | Rotational around a central point with magnitude I | $\Psi = -\dfrac{\Gamma}{2*\pi} * \ln(r)$ |
| Doublet | Circular barrier with diameter proportional to k | $\Psi = -\dfrac{\kappa}{2*\pi} * \dfrac{\sin(\theta)}{r}$ |
| Sector Flow | Flow through a radial section with incoming velocity A and going through angle $\pi/n$ | $\Psi = A * r^n * \cos(n * \theta)$ |

It should be noted that it is a common misconception that a vortex flow has rotationality—although the streamlines are curved and create a circular path around a central origin, the core fluid element is itself not rotating. This gets to the specific definition of rotationality for fluid flows—that is, the curl of the velocity vector is equal to zero. Vortex flow and all other potential flow phenomena are derived from the fundamental concepts of irrotational flow that originate with the Laplace equation:

$$\nabla^2 \phi = 0,$$

where $\phi$ is the potential function, which is always tangential to the previously mentioned stream function $\psi$. Velocity is then inferred mathematically through the relationships:

$$u = \frac{\delta \phi}{\delta x} = \frac{\delta \psi}{\delta y} \quad u_r = \frac{\delta \phi}{\delta r} = \frac{1}{r}\frac{\delta \psi}{\delta \theta}$$
$$v = \frac{\delta \phi}{\delta y} = -\frac{\delta \psi}{\delta x} \quad u_\theta = \frac{1}{r}\frac{\delta \phi}{\delta \theta} = -\frac{\delta \psi}{\delta r},$$

where u is the velocity in the x-axis, v is the velocity in the y-axis, $u_r$ is the velocity in the radial direction, and $u_\theta$ and is the velocity in the tangential direction. Due to the enforced irrotationality and incompressibility of the fluid flow (and therefore the analogue vehicle flow for purposes of the invention), the potential function and the stream function can be used in parallel and interchanged when one presents a mathematical or practical advantage over the other. Similar translation of potential phenomena and velocity components can be translated between Cartesian, radial, and spherical (not shown, but comprehended) coordinate systems, which can ease computational complexity. These concepts and their derivation are well known to those skilled in the art of fluid dynamics, but the application of such to vehicle routing is heretofore not known in the arts.

In order to create complex flow patterns, these individual components can be combined linearly; i.e., the total flow path is the sum of each component—which means no integration, iterative convergence or other computationally intensive algorithm is required. This is a significant reduction in solution complexity and allows for orders of magnitude reduction in computational requirement over more realistic, but more complex, flow calculation methods. A similar approach can be derived and considered in three dimensions, as known to those skilled in the art of fluid dynamics.

With the foregoing benefits in mind, the invention disclosed herein introduces a novel, inspirational analogue for vehicle path routing. The analogues between an aerodynamic fluid according to the principles of potential flow and in the wayfinding methodology disclosed herein are:

Flow Particle→Vehicle
Source→Origin
Sink→Destination
Doublets/Sources/Vortexes/Sectors→Obstacles
Streamline→Vehicle Route By this characterization, each element of a vehicle network can now have a closed-form mathematical definition. Because each component is additive—and not a higher level function—a multitude of considerations can be introduced to reflect the real operating environment and still be computational tractable in real-time. Derivation and inclusion of new flow pattern components without a direct analogue to fluid dynamics in two and three dimensions is also comprehended. Due to the removal of strict physical relationships dictating the mathematical algorithms (i.e., conservation of mass and momentum), this may be advantageous to represent certain goals or obstacles in a vehicle network. It should also be apparent to those skilled in the art how derivations may be done in Cartesian, radial, spherical, or other coordinate systems and converted between other systems for ease of computation.

Turning now to FIG. 4, illustrated is an exemplary hierarchy for classifying obstacles that can be encountered by a vehicle during routing. Each vehicle can have some mix of flow components that are registered or owned within different categories, such as depicted in FIG. 4, which includes:

Global—all vehicles share some distinct obstacles they must avoid; e.g., all vehicles subject to the same geographic terrain and weather.
Hierarchical—all vehicles belonging to some classification share obstacles they must avoid and/or destinations they should prioritize; e.g., civilian drones all share certain restrictions, while military manned helicopter share different restrictions.
Local—sources, destinations, and obstacles that only apply to an individual vehicle; e.g., a fixed departure zone, designated location by the user network operator, fixed landing zone.

Figure 5:
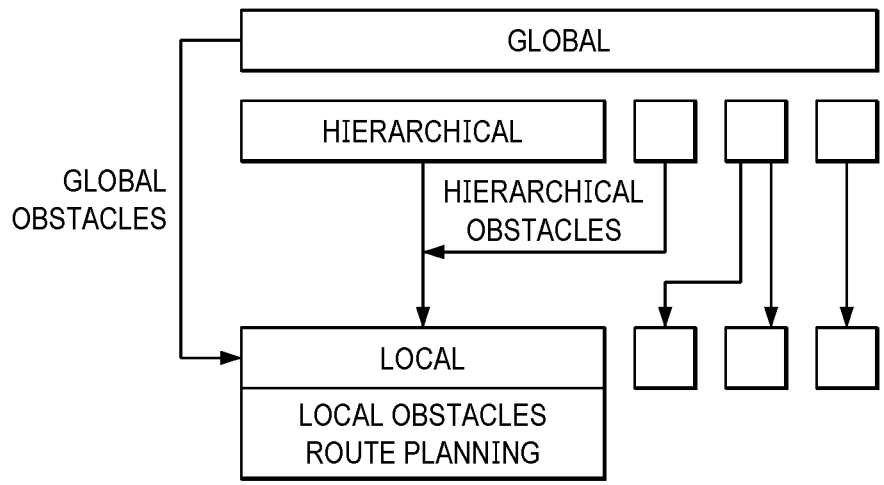
FIG. 5 illustrates an architecture for the hierarchy illustrated in FIG. 4.

Such a separation in influence on a vehicle's path has several key advantages. As a vehicle moves through space and time, or as conditions change, the number of categorical levels a vehicle is subjected to may change, as well as the inputs provided from each level. Multiple Global and Hierarchical inputs may be stacked on top of each other to represent complex and conflicted operating environments. Although there are three distinct levels depicted, any number of categorization schema for influence is also comprehended. The benefits of the invention are retained, and the principles of the invention allow for a multitude of hierarchical influences. The exemplary hierarchy is illustrated differently in FIG. 5 to emphasize one of the primary benefits of the proposed system for classifying obstacles; namely, the decentralization of data storage and computational responsibilities. Both the Global and Hierarchical levels are only responsible for comprehending their obstacles (and properties) and a list of vehicles which fall under their responsibility; there is no requirement for centralized computation of all vehicles routes nor is there the need for pushing/pulling large datasets to/from individual vehicles. In use cases where the number of vehicles is large and/or the geographic dispersion of vehicles would strain the communications network, this dissemination of responsibility would significantly improve performance and reduce costs. These aspects of the use of the exemplary hierarchy for classification of obstacles is further described with reference to FIG. 10 hereinafter.

Figure 6:
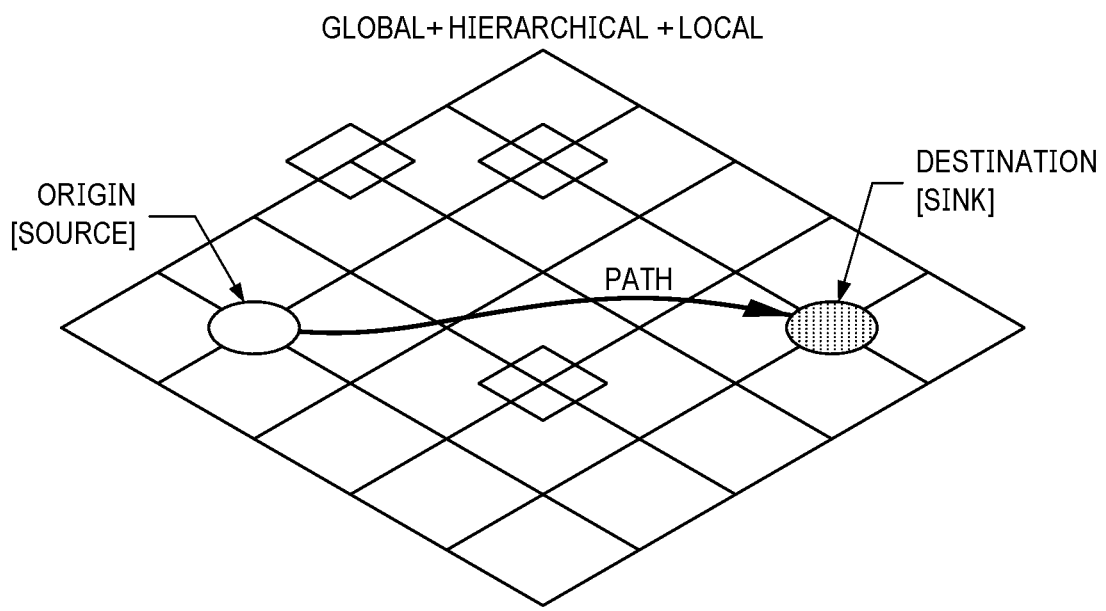
FIG. 6 illustrates the aggregation of potential flow phenomena to define the path of a vehicle.

One substantial benefit of the proposed approach is the ability to aggregate many disparate influences into a seamless wayfinding system, visualized in FIG. 6 (which is an extension of FIG. 4), including:

updates to global or hierarchical components can immediately impact route planning of a multitude of vehicles with simple adjustments;
routes can be dynamically calculated/recalculated with low computational requirements at the vehicle without the need for centralized calculation and constant, large-bandwidth communications channels;
vehicles can subscribe to a multitude of global or hierarchical categories depending on area of operation, jurisdiction, vehicle ownership, or other; and,
additional layers can be overlaid to a vehicle's subscribed components when the vehicle enters a new area, the responsibility of the vehicle changes, or if new environmental characteristics have arisen.

It cannot be overstated how beneficial an automated system that provides a reliable and tractable route is. For example, in order to accommodate the above influences, current flight planning of commercial aviation aircraft in the US requires approximately 15,000 air traffic controllers. This manpower is required even with permanently designated restricted air spaces, fixed departure and approach paths, and limited air traffic primary support to approximately 500 airports that serve commercial travel. (See: "Airport Certification Status Table," FAA https://www.faa.gov/airports/airport_safety/part139_cert/media/part139-cert-status-table.xls) Use cases that are being proposed currently, such as urban air taxies or drone package delivery, will not have these simplifying assumptions or restrictions on usage zones and must, therefore, be much more streamlined in order to not require inordinate manpower.

Turning now to FIGS. 7-A, 7-B, and 7-C, illustrated is an exemplary wayfinding path of a vehicle, according to the principles of the invention, for no obstacles, global obstacles, and hierarchical obstacles, respectively. FIG. 7-A illustrates the path when no obstacles are present and the vehicle is free to proceed directly from its origin to a destination; FIG. 7-B illustrates the path if overlaid with a global obstacle that pertains to many vehicles and imparts a radial rejection to all vehicles; and, FIG. 7-C illustrates the path if overlaid with an asymmetric radial hierarchical obstacle that only applies to a subset of vehicles of which the current vehicle is one. The trajectory illustrated in FIG. 7-C is formed by aggregating all the potential flow objects subject to the vehicle. Using the analogous potential flow definitions described previously, this is represented as a current location source+destination sink+global obstacle doublet+hierarchical obstacle sector flow. According to the principles of the invention:

- A source pushes a vehicle in a radial direction, while a sink inversely draws a vehicle toward it.
- A doublet provides a virtual circular boundary which will tend to curve the trajectory around it tangentially; this could be, for example, representative of a structure to avoid.
- A sector flow obstacle will impart a radial flow, but only within a certain angle—flow paths outside of that angular cross-section are not influenced; this could be representative, for example, of the air space allocated to a fixed takeoff zone.

The resultant trajectory/path of the vehicle is the mathematical addition at every point in the x, y, (and z) planes of the vectors imparted by each of the four components. The solution specific to a vehicle is where the stream function as defined in the potential flow analogue is constant, whose value is derived by inputting the current location of the vehicle—i.e., current position is the known initial condition.

Each of the four components has a defined origin or central point, which provides a local coordinate reference for that individual component—e.g., the doublet with previously disclosed stream function $$\Psi = -\frac{\kappa}{2*\pi} * \frac{\sin(\theta)}{r}$$

refers its radius r and angle theta relative to its own center point. In order to combine this component along with other components, a common coordinate system which is relative to (or is comprehended by) the vehicle is required. These transformations are well known to those skilled in the art of guidance and control and is, therefore, not described herein.

Figure 8:
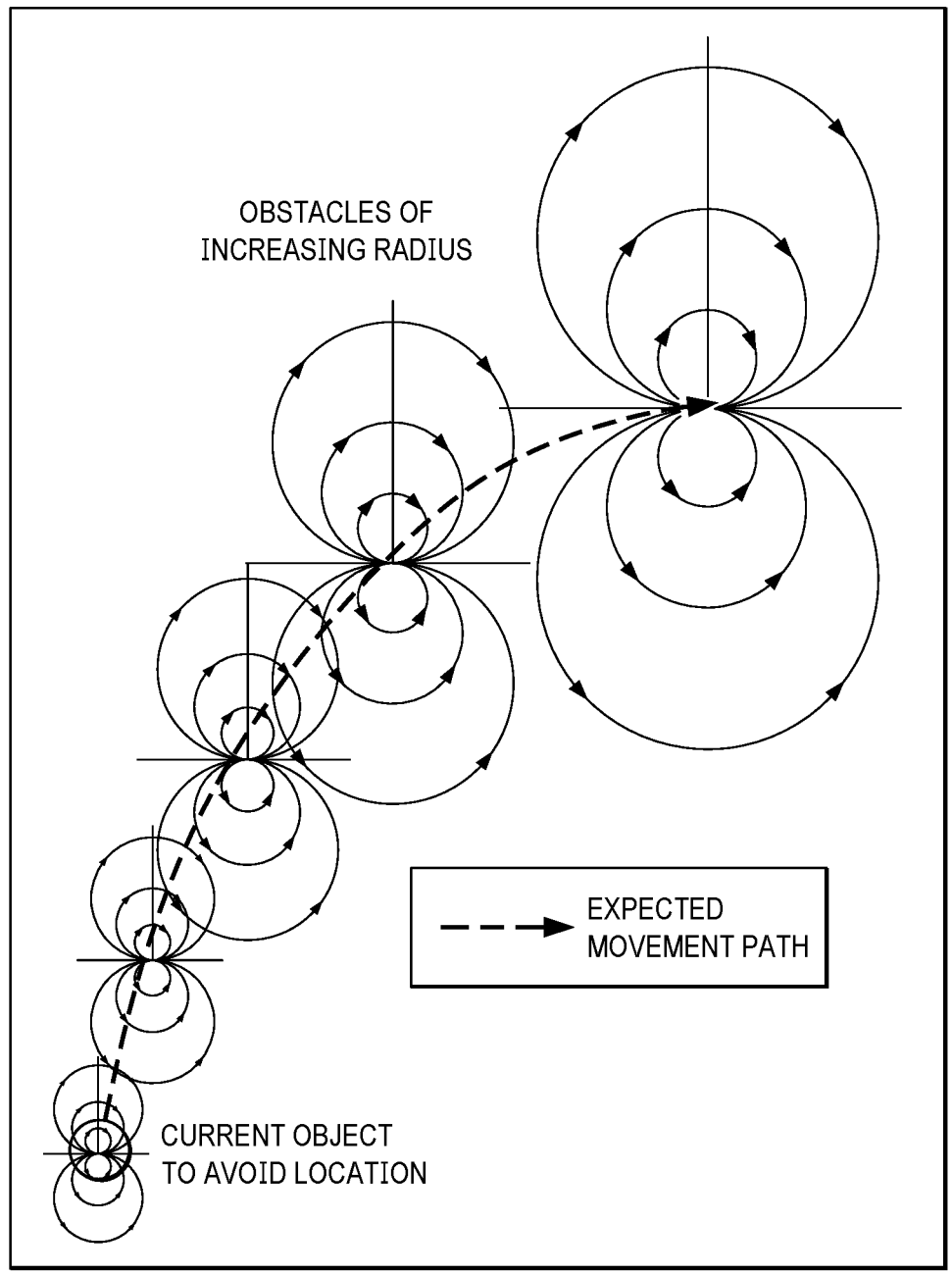
FIG. 8 illustrates an exemplary path of a moving obstacle as a compound collection of flow phenomena.

For some practical applications, objects of interest may be best represented as a compound collection of flow phenomena. In FIG. 8, a moving obstacle (such as an adversary aircraft) may a have a known location and an inferred expected future path. Based on its speed and distance relative to the vehicle of interest, it is likely not important to avoid where the adversary vehicle is now, but rather to avoid where it is going to be. In order to represent this use case, several doublets could be combined along a curved trajectory line where the doublets grow in strength as they proceed along the line. Other solutions to this specific application, as well as other compound uses of basic flow phenomena are also comprehended.

Figure 9:
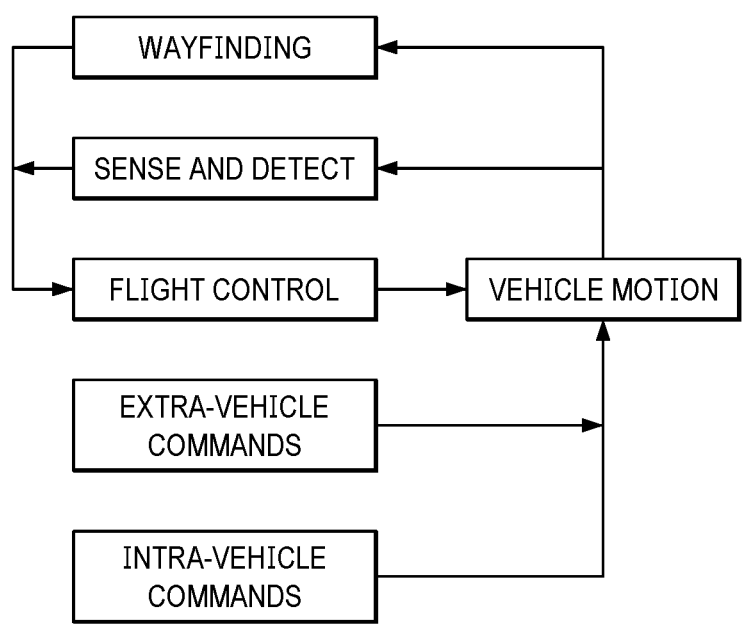
FIG. 9 illustrates an exemplary architecture for a vehicle control system based on the principles of the invention.

Turning now to FIG. 9, illustrated is an exemplary architecture for a vehicle control system based on the principles of the invention, schematically identifying how the wayfinding functionality can be integrated with other vehicle control systems. As depicted in FIG. 9, the wayfinding functionality is part of an outer control loop with dictates broad motion of a vehicle. In the exemplary architecture, other systems include, but are not limited to:

Sense & Detect manages detection of objects/obstacles through visual, radio frequency (RF), or other means. Depending on the vehicle, mission, and object identification, Sense & Detect can have very different goals: collision avoidance, cargo/passenger pickup, controlled landing, controlled mating with other vehicles, surveillance, and target prosecution are examples requiring this type of control.

Flight Control manages safe and controlled flight of vehicles based on propulsion, aerodynamic, and other forces.

Extra-Vehicle Commands are commands by humans or systems outside the vehicle—e.g., FAA, police forces, emergency vehicles.

Intra-Vehicle Commands are commands by humans or systems inside the vehicle.

The overall vehicle motion, then, is governed by the synthesis of each these inputs. Depending on the contextual setting, the prioritization of inputs can be very different—for instance, the vehicle flight control system can override in instances where other systems dictate a maneuver that is unsafe or physically impossible. Multiple approaches for prioritization are comprehended—the synthesis of multiple parallel "digital twins" as disclosed in U.S. Patent Publication No. 2019/0243933, is one such example. Those skilled in the art will also recognize how a mathematical optimizer of the type disclosed in U.S. Patent Publication No. 2020/0192777 A1 can be utilized to further enhance performance of the systems and methods described herein for certain use cases. Similarly, they will appreciate how incorporation of an "intelligent predictor" as disclosed in U.S. Patent Publication No. 2020/0193318 A1, and/or, the "advanced AI" principles disclosed in U.S. Patent Publication No. 2020/0193075 A1 and U.S. Patent Publication No. 2020/0193271 A1 can be utilized to enhance performance of the system and methods disclosed herein. Each of the foregoing U.S. patent applications are commonly owned by the Applicant hereof and incorporated herein by reference. Exemplary integrations of the disclosures of those applications include, but are not limited to:

U.S. Patent Publication No. 2020/0193318 A1 discloses a system and method for estimating the future value of a function based solely on its historical values. It performs this function by comprehending the noise, error, trend, and seasonality of the input and applying multiple novel approaches in conjunction to project a likely distribution of future states. In the context of the invention disclosed herein, this approach may be used as a trajectory forecasting function for other vehicles that may, or may not be, within the network—i.e., taking flight path of a foreign object that has been detected or predicting where it will be in the near future U.S. Patent Publication No. 2020/0192777 A1 discloses a system and method which optimizes a non-linear, non-continuous, and stochastic series of objective functions subject to both equality and inequality constraints. This type of optimization is both unique and novel and applies to a broad class of practical applications that are not serviced by current approaches in the field. As applied to the invention disclosed herein, the principles disclosed therein can be used at the organizational level to prioritize a multitude of targets based on variable obstacles, target locations, target priorities, and payload delivery success rates.

U.S. Patent Publication No. 2020/0193075 A1 discloses a system and method which adaptively learns a multivariate, stochastic network of functions. By invoking non-linearity and non-continuity, it builds upon the disclosures of U.S. Patent Publication No. 2020/0192777 A1 to create a system that requires much less historical training data and more accurately reflects complex adaptive networks than current approaches with are restricted to simple linear functions. With respect to the invention disclosed herein, the principles of the application can be used at global, hierarchical and vehicle levels to identify trends in overall vehicle traffic in order to project future traffic patterns and detect anomalous behavior.

U.S. Patent Publication No. 2020/0193271 A1 discloses a system and method which aggregates and discriminates multiple digital twins. Each twin may be purpose built for a specific sub-application, context, and/or may be using a different mechanism for describing the asset. The application also discloses a system for dynamically combining each digital twin based on the operating context of asset, past accuracy of each digital twin, and other information. With respect to the invention disclosed herein, the principles disclosed in therein can be used to discriminate and aggregate multiple algorithms within the vehicle control system based on the operating conditions and environmental context (such as depicted in FIG. 9).

All of the above applications and extensions of the disclosures of the prior applications are illustrative—other combined applications are comprehended.

Figure 10:
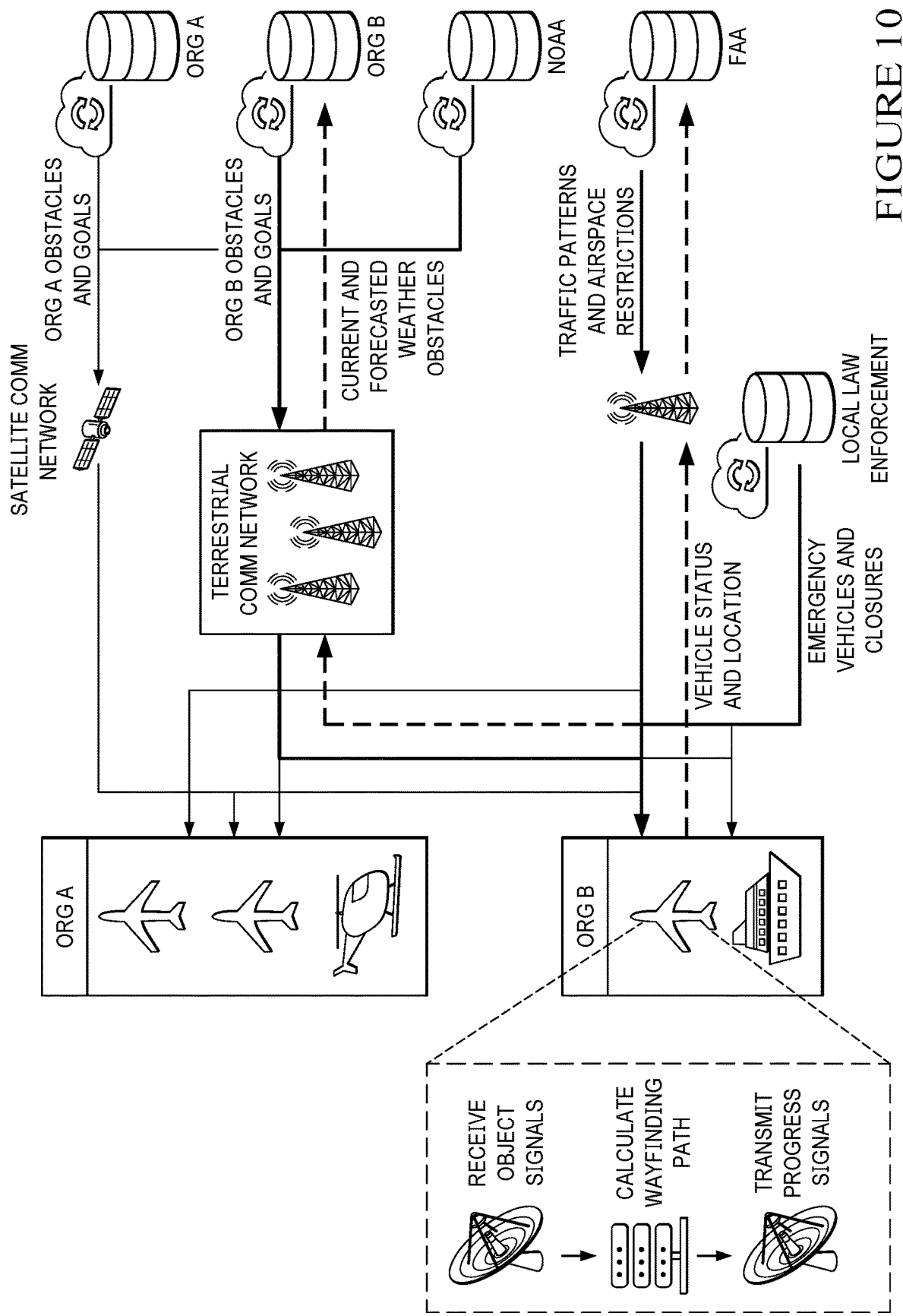
FIG. 10 illustrates an exemplary architecture of a commercial transportation network suitable to utilize the principles of the invention.

Referring now to FIG. 10, illustrated is an exemplary architecture of a commercial transportation network suitable to utilize the principles of the invention; the exemplary architecture can be applied to both manned and unmanned aircraft—other permutations depicted in the figure are comprehended but are not exhaustive. Within the figure, the focus aircraft is subject to the following sources of input:

Aircraft is owned/operated by Organization B ("Org B") which dictates the specific goals (i.e. location, priority, payload) that are required of the aircraft. As illustrated, Org B hosts this data for all vehicles in a cloud-based data repository and communicates to its vehicles through a terrestrial cellular communication network.

The National Oceanic and Atmospheric Administration (NOAA) calculates, hosts and broadcasts the time and location of potential inclement weather.

The Federal Aviation Administration (FAA) determines, and broadcasts restricted flight areas within a given area of operations.

Local law enforcement tracks and broadcasts the location and priority of emergency vehicles and unexpected regional closures.

The aircraft receives this data through some means of signal reception and processing. It then calculates its movement path using the principles of the invention disclosed herein— this path is recalculated in pseudo-real-time as input signals are received. Optionally, and potentially at some lower frequency, the aircraft transmits its location to the FAA for tracking and/or record keeping. The aircraft may also transmit its location, vehicle status, and the status of any achieved/failed goals (e.g., a payload has been delivered) to its owning organization or other entity.

In the exemplary implementation, the wayfinding system calculation is performed within onboard computer processing capability on the aircraft. This has the benefit of greatly reducing the required centralized calculations within Organization B's data centers/aggregation points/cloud servers. This can also provide significant benefit by reducing strain on the underlying communications network—e.g., passing only the goal location and priority to the vehicle for calculation, whereas a centralized calculation paradigm passes the entire flight plan each time the environment changes.

In use cases and implementations where collision or congestion avoidance is also a goal, the obstacles & goal parameters of other vehicles within the aircraft's immediate vicinity may also be transmitted to the aircraft for path calculation as a time-varying obstacle, according to the principles of the invention described supra. Because the entire trajectory is not necessarily transmitted, decentralized computation and bandwidth benefits can be realized. This combination of vehicle types, transmission paths, transmission media, relevant organizations, goals, and obstacles are purely exemplary. Other combinations are comprehended and several more proposed within use cases described hereinafter.

Figure 11:
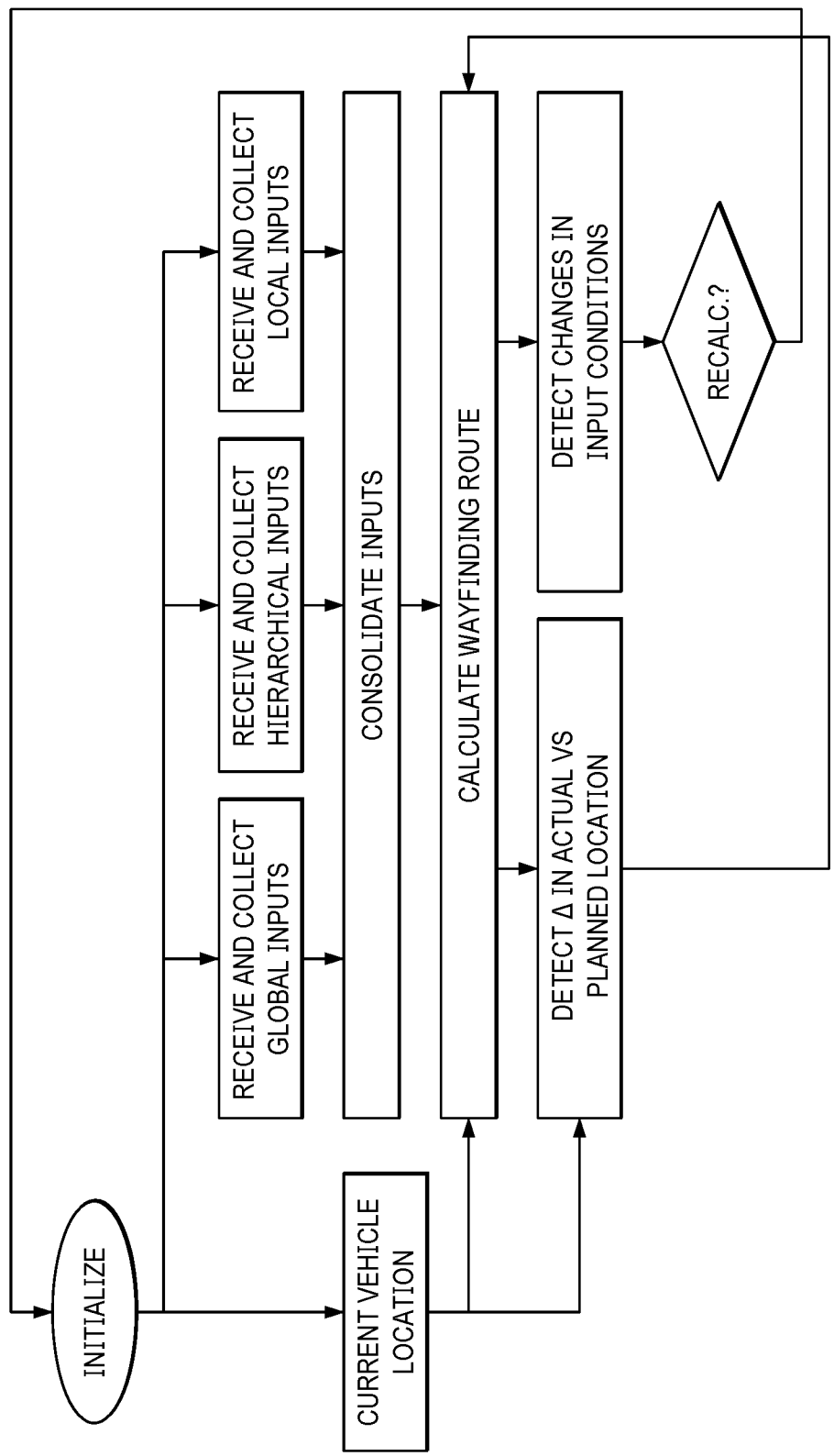
FIG. 11 illustrates an exemplary method for the automatic routing of at-least partially-autonomous vehicles utilizing the principles of the invention.

Finally, reference is made to FIG. 11, which illustrates an exemplary method for the automatic routing of at-least partially-autonomous vehicles utilizing the principles of the invention; the high-level process flow comprises receiving inputs and determining the wayfinding route according to the principles disclosed herein. The process can be performed wholly, or in part, at either the network edge (on or very near the vehicle), at an aggregation point (a network or organizational hub), or in a centralized data system hosted as a public or private cloud.

With reference to FIG. 11, the process begins with an Initialize function which verifies the Current Vehicle Location and any Inputs needed to calculate the current route. Initialization can be called when a vehicle is first launched, when it has diverted substantially away from its intended path, when a goal has been competed, when changes to its inputs at any level have changed, when environmental conditions have shifted, at a regular time interval, or on some other basis. Next, inputs are received/collected; according to the exemplary schema described supra, there can be three levels of inputs (Global, Hierarchical, and Local). After the various inputs are independently collected, they are consolidated in a Consolidate Inputs step. These similar functions can be done in parallel and processed by a common or independent systems; they may also be received over different modes of communication. For instance, Global inputs may be received over a specific radio frequency, Hierarchical inputs may be received over a securely encrypted channel, and Local inputs may be taken directly by the vehicle by scanning, for example, a QR code on a payload. Other communications channels such as internet connection, satellite communications, direct wired connections, visual signaling systems, laser designators, and other communication protocols are comprehended. Any of these may be used to solely or jointly communicate any type of obstacles or goal to a vehicle or group of vehicles.

In order to calculate a path, a vehicles Current Location must be known. This may be done in a macro-sense via Global Position System (GPS) or via a local reference frame (e.g., a location with a company's industrial site). If using a global reference frame, the location can be determined by available satellite communications or via triangulation from known fixed objects. If using a local reference frame, the location is likely determined by distance relative to known points such as control towers, communication nodes, or other fixed positions.

One the Current Vehicle Location and Obstacles/Goals are received/collected, the vehicle's Wayfinding Route is calculated. As described supra, this calculation can be wholly or partially performed by the vehicle or external systems; for example, the calculation can be done either on the vehicle with local compute power, in a centralized cloud environment, or at an intermediate aggregation point.

In a further step, the Wayfinding Route can be recalculated based on several different triggering events:

- If no input or obstacle data has changed, the Wayfinding Route will be constant and can therefore be maintained without recalculating. The directional vector that is suggested by the route can then be fed in whole or in part to the overall vehicle control system in accordance with FIG. 9.
- If input or obstacle data has changed (or has been changed beyond a provided or calculated threshold), the Wayfinding Route may divert from the previous path and will need to be recalculated. Obstacle/Goal data from different categorical levels and/or different communication channels may be received and trigger recalculation in a non-synchronous fashion. This refreshing function may happen frequently and can therefore be limited if electrical or computational or other resources are limited.
- The Wayfinding Route can be re-calculated on a standard time interval to ensure any changes in the environment/vehicle dynamics are captured.
- If the estimated Location, or "Planned Location", dictated by a previously-calculated Wayfinding Route is significantly different than the Current Vehicle Location, or "Actual Location", the Wayfinding Route is preferably recalculated. This scenario is applicable, for example, when a vehicle has been diverted due to some external force or due to some other control system depicted in FIG. 9 which has caused a vehicle to change its path. The Wayfinding Route should be recalculated in this case because the route going through the new location may be different than the previous path due to changes in position relative to either obstacles or goals.
- At any point in time, if an obstacle or goal is removed, added, edited or if the status of the obstacle, goal, or vehicle changes in any way such that its imparted flow path on the vehicle is changed, the overall process may be reinitialized, in part or in whole, to calculate a new Wayfinding Route.

Other combinations of the above approaches for determining the frequency of recalculation may be used in conjunction or in parallel based on the bandwidth, cost, safety impacts, performance impacts, or other considerations. For instance, input data may be changing continuously but recalculation can be delayed in order to save computational power in instances where the Wayfinding Route is not likely to be altered significantly (at least within some defined safety threshold).

The following use cases illustrate the application of the principles of the invention to wayfinding scenarios for various types of vehicles; the use cases are not exhaustive, but are an exercise in demonstrating the benefit and application of the systems and methods disclosed herein. It should be noted that the wide application and variation within the following use cases is itself a benefit of the disclosed principles. A single systematic, unified approach that solves these different problems has the potential to speed time to implementation, decrease development costs, and improve the iterative cycle of improvement of all implementations across applications and markets.

Integrated Civilian Airspace

As air vehicles become lighter, cheaper, and more easily controlled through autonomous or semi-autonomous means, the need for integrated airspace control will be required. Manual dictation and approval of flight paths through existing administrative authorities is not feasible. Blanket permission to operate within a flight envelope (current guidance) will increasingly come under stress/scrutiny as airspace becomes more congested.

- Global Characteristics: Obstacles representing weather patterns, geographic topography
- Hierarchical Characteristics: Obstacles representing sensitive areas (i.e., tall buildings, airports, hospitals) would be open to cleared vehicles classes (e.g., medical vehicles, police vehicles, certified passenger transport), but would appear as areas that must be avoided with a given radius for all other vehicles
- Local Vehicle Characteristics
   Wayfinding manages gross movements of vehicles. Sense and detect control systems manage collision avoidance and airspace deconfliction. Other flight control algorithms or extra-/intra-vehicle commands take over on initial takeoff and final approach. Specific vehicle types have their own local characteristics:
- Passenger Taxi:
   - If a passenger is in a vehicle, Origin and Destination have been agreed upon—dynamic change of Destination by passenger would instantly be recomputed.
   - If a passenger is not in the vehicle, Destination(s) would be set by population centers, historical tendencies, current demand (managed through a hierarchical ledger), or other approach. As real demand becomes available and a vehicle approaches, a passenger can be removed from the hierarchical ledger as a demand sink. This, and other implementations, may necessitate the integration of a blockchain ledger, or other similar, technology.
- Cargo Delivery:
   - Based upon the distance, priority, certification status, or other variables, hierarchical characteristics for available altitude ranges, speed, or other flight characteristic can be dictated through a combination of obstacles.
   - During delivery, origin and destination can be dictated by the cargo properties.
   - After delivery, destination is dictated by hierarchical demand—i.e., distribution centers that were not necessarily the original Origin of the vehicle can request the vehicles return for future use
- Benefits
   - By automating the flight path of a multitude of vehicles in a predictable manner, the system can be ensured for safety to the oversight bodies and at the same time be ensured for overall system performance by the operating entity.
   - Once the system has been tested and implemented, the need for ongoing human decision-making is greatly reduced compared to current systems.
   - By disseminating the majority of calculations to the vehicles in the network, bandwidth from vehicles to centralized networks is reduced over other approaches. This lowers the overall operating cost of both services in the use case, while also reducing demand on the network which may or may not be capable of withstanding such loads.

Swarming Military Target Acquisition and Pursuit

Logistics, cost, effectiveness, and safety concerns will push for unmanned vehicles to operate alongside or in-place of human-piloted military vehicles. Transition is already underway to different degrees for some mission sets (e.g., high altitude surveillance). In scenarios where multitudes (i.e., hundreds or thousands) of vehicles and targets may be involved, manual flight planning is not feasible, especially when the "fog of war" dictates uncertain numbers/locations/characteristics. The ability to dynamically implement and reassess large numbers of heterogeneous vehicles to purse a mix of Targets is required.

Global Characteristics:
Obstacles representing weather patterns, geographic topography, political boundaries, conflict zones.

Hierarchical Characteristics:
Obstacles represent different stationary and/or mobile threats—the strength of their repelling force would be a function of their capability and the ability of the vehicle class to defeat that capability.
Destinations represent different stationary and/or mobile targets—some combination of Hierarchical and Local depending on specific mission and number of targets.
Destinations have uncertainty around their location and/or Strength depending on available intelligence.
Strength of the Destination (Sink flow pattern) are determined by priority and importance of engaging that target.
As targets are engaged, lower strength Destinations can become reprioritized.
Because Path is determined by proximity to Targets and not just strength of Target, lower priority Targets can be engaged before higher priority Targets for individual vehicle paths.
A moveable sink also can be used to represent a vehicle hub, mothership, vehicle with more advanced sensors, targeting equipment or weapons payload, manned flight operator, communications routing hub or other influence that is beneficial to remain close to.

Local Characteristics:
Threats which the specific vehicle are uniquely susceptible to can be given unique or amplified strength.
Target strength can be modulated by randomness or other mathematical chaotic approach to express uncertain target characteristics, ensure resiliency and as a countermeasure to reverse-engineering.
Target and obstacles strength also can be modulated by the static or dynamic characteristics of the vehicle—i.e., a specific adversary is more lethal/capable against a vehicle; due to battle damage a vehicle will be provide more leeway between an adversary.

Benefits
Planning of coordinated joint military engagements is currently a burdensome process with several flaws; it takes too long for emerging threats, must manually account for contingencies once the engagement begins, and does not allow for in-engagement re-planning (see, for example: Air Space Total Awareness for Rapid Tactical Execution (ASTARTE) Contract Opportunity, Defense Advanced Research Projects Agency (DARPA) https://beta.sam.gov/opp/897bf13ef9a044b298d0de164781412c/view). The disclosed system and methods can rapidly re-plan in real-time, alleviating these current pain points.

The system can incorporate domain knowledge of human operators and decision-makers a priori, while still being dynamic to a rapidly changing battlespace.

The system is understandable and repeatable, without being predictable to the adversary due to information asymmetry and the inherent ability to apply probabilistic methods.

Adversary Submarine Tracking

Tracking of manned and unmanned underwater vehicles has been a significant focus of military maritime organizations for decades. Within the scope of this discussion, there is significant overlap in required systems needed to forecast vehicle trajectories—however, they are needed in an inverse and uncertain manner. For example, the obstacles and goals perceived by the vehicle may be unclear to the observer in both their existence and their magnitude of interest. This use case, in particular, necessitates the need for probabilistically inserted and varied entities. It may not be known whether the vehicle or vehicles being tracked are aware of countermeasures, nor known exactly what their goals are. By employing the principles disclosed herein, however, a series of projected trajectories can be rapidly created and re-calculated as new information is acquired.

Global Characteristics:
Obstacles representing weather patterns, geographic topography, ocean floor topography.

Hierarchical Characteristics:
Fixed obstacles representing geopolitical boundaries; red (adversary), blue (friendly) and gray (neutral) elements would each have their own hierarchical mapping.
Dynamic obstacles which may or may not be known representing active countermeasures (i.e., defensive vessels, mines, sonar arrays).
Points of strategic, economic or military interest.

Local Characteristics:
Vehicle capabilities and desired mission focus.
Geospatial relationship of the individual vehicle to the larger asset fleet.

Benefits:
Manual process that is highly open to human subjectivity can be standardized across a fleet.
Low computational footprint allows system to reside on a tracking vessel, passive tracking device, or other power/bandwidth restricted environment.
Military intelligence that is inherently probabilistic—e.g., it is likely that the target is moving towards location X—can be included in the system without limitation.

Maritime Cargo Navigation

Cargo vessels are becoming increasingly important to a globally-connected supply chain, and decreasingly staffed due to autonomous control, cost, and safety implications. In order to manage this complex, mixed, remote navigational problem, an open, transparent, but low-bandwidth route planning solution is required.

Global Characteristics:
Obstacles representing weather patterns, geographic topography, designated shipping lanes, port boundaries.

Hierarchical Characteristics:
Obstacles representing geopolitical/organizational/corporate boundaries.

Local Characteristics:
  Origin and Destination set by shipper. Destination may dynamically reset by receiver for logistics or other purposes.
Benefits
  Reduce required manpower needed to operate vessels and coordinate vessels around ports.
  Improve safety and efficiency of maritime supply chain.

Mars Surface Exploration

Unmanned exploration of the Martian surface has, so far, been isolated to a few number of well-sensored vehicles with direct control connection to Earth-based mission control. The manual nature of the control system is reflective of the long mission planning cycle and the low number of vehicles (most programs have focused on one rover). A future use case instead involves multiple terrestrial, airborne or mixed-modal rovers that are all tasked with exploring the terrain and, for example, identifying or collecting useful minerals. This type of mission may or may not also include a small contingency of human operators on the surface of Mars, in orbit, on a transit path to Mars, on Earth, or in some other control location.

Global Characteristics:
  Geographic topography.
Hierarchical Characteristics:
  Different terrains would appear as different obstacle types depending on the class and capability of the rover.
Local Characteristics:
  Based on the condition, power level, and instrumentation of the rover, areas of potential interest would be modulated as potential sink flows for exploration.
Benefits
  Due to the lag in signal transmission between Earth and Mars (between five and 20 minutes), the onboard calculation and recalculation of route allows for rapid adjustment to changes in the environment.
  A multitude of vehicles may be used to more quickly explore a geographic area without the need for a one-to-one expansion on mission control manpower/infrastructure.
  Reduction in required oversight allows any human operators near or on Mars to more easily manage a larger fleet of exploratory or resource collecting vehicles.
  Uncertainty around weather conditions, locations and usefulness of areas of interest, and others may be included.
  Current power level, time of day, relative location to other vehicles, vehicle condition, power needed to transverse to destination/home base, and other dynamic variables can all be used in an automated fashion to adjust wayfinding routes as conditions change.

Wayfinding for Data Transfer

Further use cases have been identified where information needs to be moved within a network between its source location to one or more destination locations through an uncertain and dynamic series of intermediate nodes. Within such use cases, each transmission node may only have visibility into immediately adjacent nodes or into a subset of the surrounding area. Common routing systems do not provide the flexibility to adjust to heterogenous node types, heterogenous information packet priority, and restricted network visibility, but the principles disclosed hereinabove are adaptable to such further use cases.

The proposed invention builds off the approaches disclosed in the prior applications referenced supra to create a combined system focusing on the routing of information, or data transfer, in dynamic networks; the novel application of aerodynamic potential flow theory introduced in the '803 application is modified to substitute "intangible" obstacles to data transfer for real world physical obstacles. Because the networks are heterogeneous in packet priority, heterogenous in node capability, heterogenous in packet type, and dynamic in time a fully autonomous system is required. No manual system nor static guidelines for information routing satisfies the required use case.

As data can be collected within individual elements of a network through radio frequency (RF), visual, audio, infrared, temperature, force, or any other analogue or digital sensor, that information is desired within another portion of the network. This could be within the context of any number of commercial or military concept of operations. As the information is collected, the system must make some intelligent judgement on the best method to transfer it by considering its information half-life (how long is the information useful), the current location of the data, the location of one or more destinations that require the data, the network availability for nodes capable of transferring this specific category of information packet, among other potential influencers.

By using the approach discussed in the '803 application, the network nodes (which could be satellites, air vehicles, space vehicles, ground stations or other assets with receive and emit capabilities) are treated as central points at which to anchor flow phenomena, and the information packets are treated as flow particles that are directed through the flow. The availability (or unavailability) of individual nodes is treated as flow phenomena, particularly as flow sources (i.e., elements that tend to repel particles in a radial pattern)—the strength of the source is derived from each node's ability to accept packets of a particular type at a given point in time. As load on the nodes change, so too will each the strength of the source flow element representation. It should be noted that there could be disparities in availability for a single node depending on packet type—e.g., full availability to receive text, but only limited availability to receive video. This can be reflective of the capabilities of a node due to compute, security, ownership, or other considerations. This approach differs from "link cost" in that each node runs the optimization calculation for the data then decides about the next best hop, not the full path. The proposed approach holistically includes latency, node buffer storage, and priority to multi-dimensional path choices, not just bandwidth and current congestion. This approach is not geared towards traditional routers, but sparse wide area networks without continuous connectivity between nodes. At each "hop" a stochastic optimization evaluation of the packet's history, ultimate destination, priority, and state of its nearest neighbors (or any nodes it can "see") is performed and a choice for this data bundle (not each packet) is made.

Figure 12:
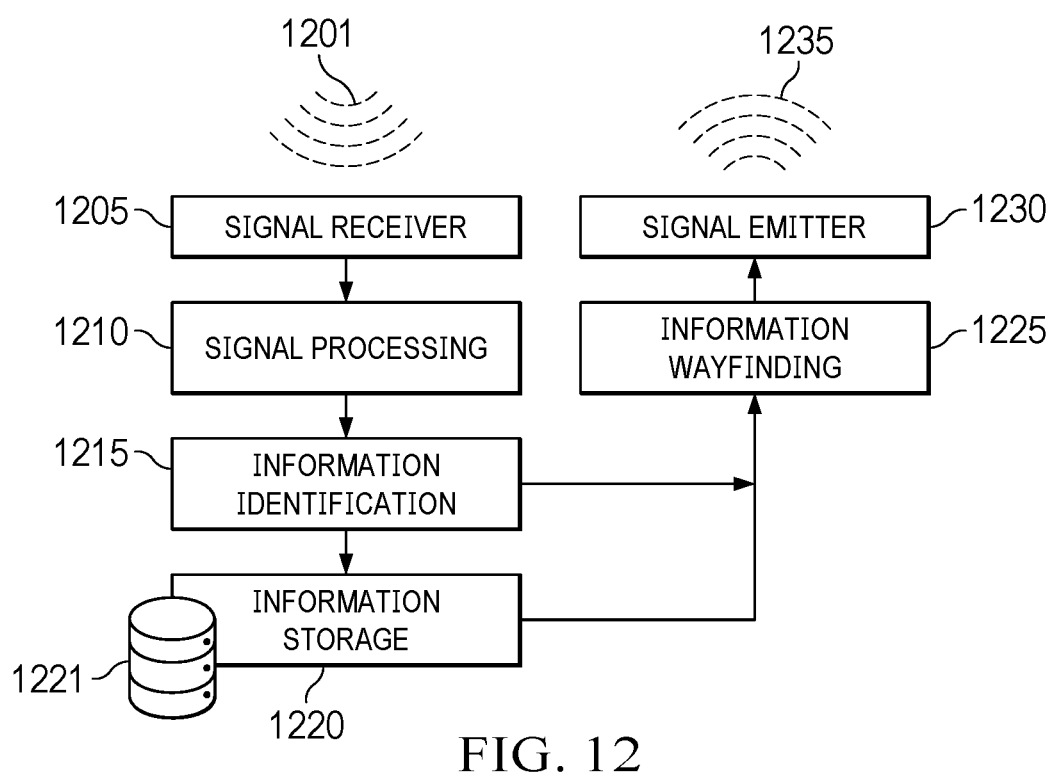
FIG. 12 illustrates an exemplary architecture of a system for collection and dispersion of information in a dynamic network.

FIG. 12 illustrates the overall connection between collection of signals 1201 and dispersion of information to destinations or other intermediary nodes 1235. The signal receiver 1205 and signal emitter 1230 components may be some mix of hardware and software components, and may be specialized for a specific bandwidth, frequency, or type of signal (radio, electromagnetic, visual, among others). There may also be multiple receiver elements that perform redundant functions or specialized functions (e.g., one receiver focuses on broadband communication from other node elements, while a second receiver focuses on capturing visual light images). There is an optional capability to process the signal on the device 1210 as either a software component or hardware component or some combination. The purpose of the signal processing element is to reduce noise, extract useful components, aggregate time series data or synthesize multiple competing signals among other functions. Elements of interest 1215 can then be triaged for immediate potential transfer into the Information Wayfinding system 1225 or can be stored within a database 1221 or other storage mechanism 1220 for periodic or batch transmission. Emission may occur over wireless or wired information protocols that are known to those in the field of information communication networks.

Figure 13:
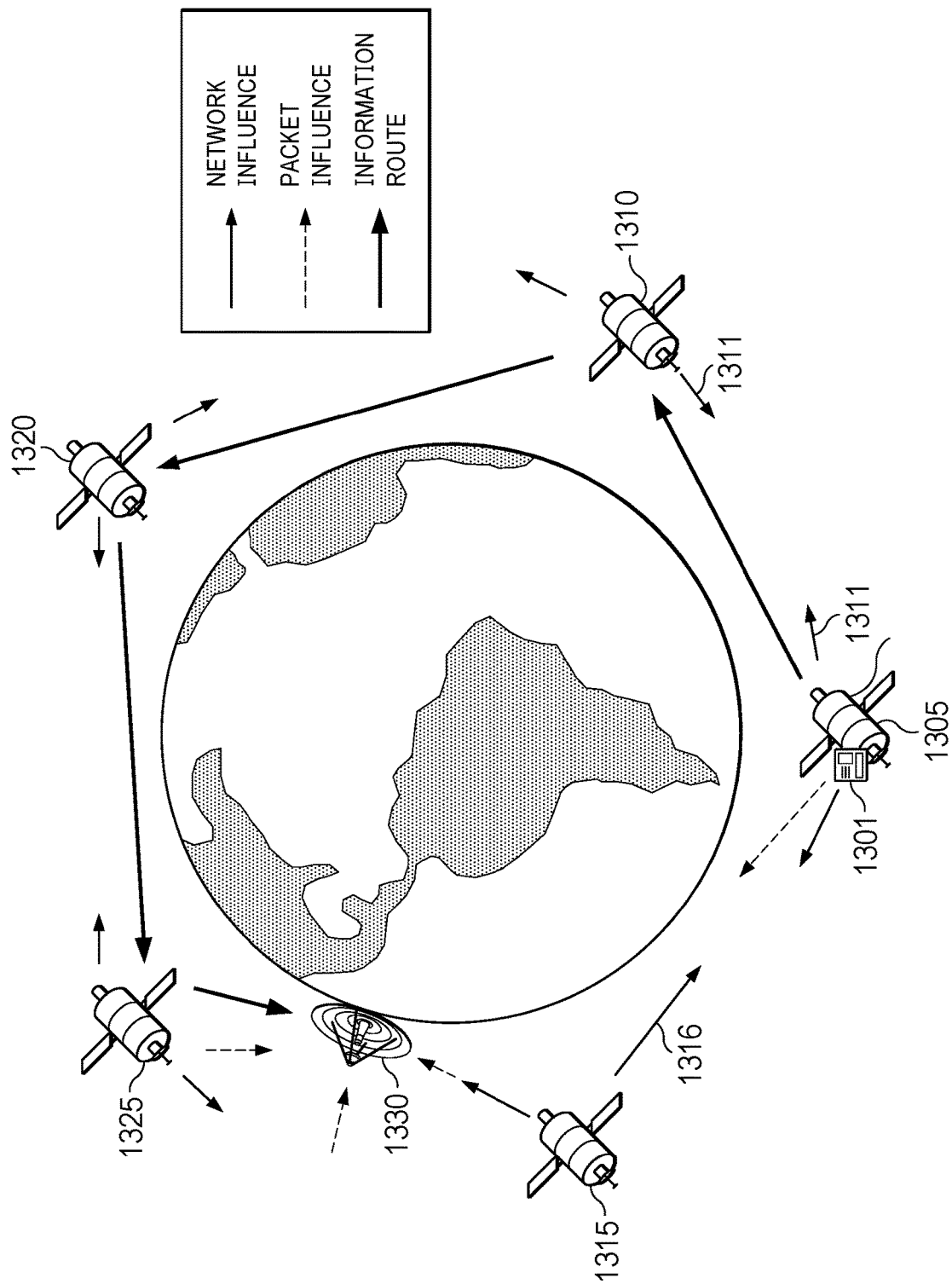
FIG. 13 illustrates an exemplary dynamic network in which the principles for automatic routing of information can be employed; and,
FIG. 14 illustrates an exemplary block schematic of a methodology for automatic routing of information in a dynamic network.

In an exemplary embodiment illustrated in FIG. 13, a packet of information 1301 has been collected at element 1305. Based on static or contextual rules, element A has determined that information must be routed to element 1330, which in this case is a fixed ground element. Due to limited connectivity range of element 1305, only the availability of elements 1315 and 1310 are available—their availability is depicted as the Network Influence fields depicted 1311. Longer lines of Network Influence are used for elements which are overstressed and therefore only accept information packets of high priority and/or time sensitivity. The Information Packet originating from 1305 is responsible for storing and communicating its desired destination, required time of arrival, and priority status.

With the influencing magnitude 1316 denoting that element 1315 is overloaded, and the information packet does not have enough priority to overrule other traffic, the system instead routes the information through element 1310. Once at this element, the packet naturally flows through elements 1320 and 1325 before arriving at its final destination 1330. This counterintuitive example to route information along a longer path in order to avoid an oversaturated (but closer) node is an exemplary use of the system to avoid undue stress or crash within the network.

Other embodiments include, but are not limited to, elements with ground-based vehicles, mobile devices, airborne vehicles, and stationary ground assets.

Stream Function and Potential Flow Analogy

Figure 14:
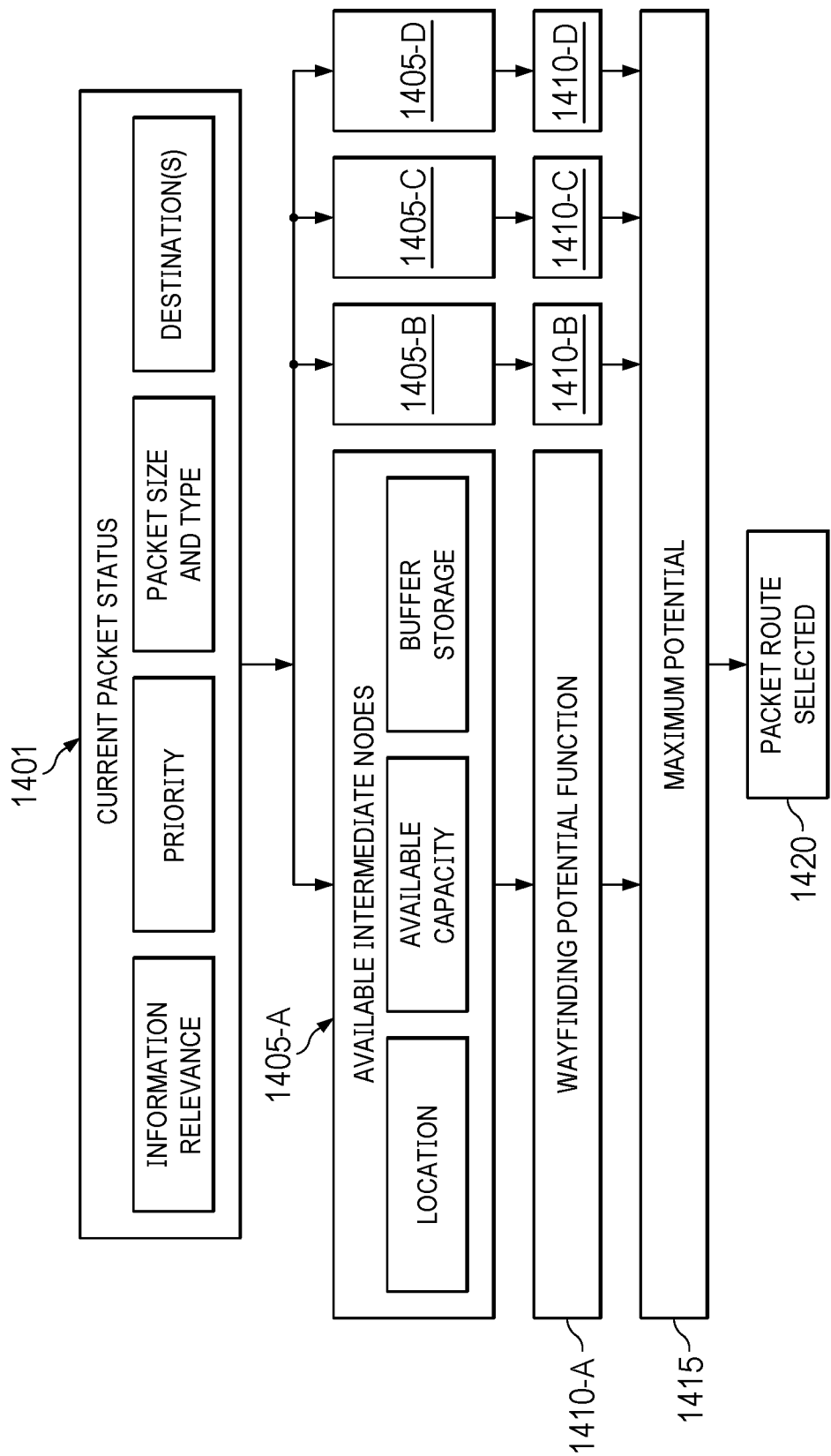

Within each information node and at a specific point in time, FIG. 14 depicts the Information Wayfinding system. The status of the information packet 1401 contains multiple data elements that describe and are used to determine its routing. Exemplary data include relevance of the information, priority, type of information (e.g., text, image, video), and destination(s). Other data describing the information may also be necessary in order to adjudicate network conflicts. These data are used in conjunction with real-time or pseudo real-time data describing available interim nodes (generally designated as 1405); and are provided for the subset of nodes (e.g. 1405-B, 1405-C and 1405-D) within the network that are directly available at the time of required emission. Exemplary descriptive data of interim nodes may include, but is not limited to, the spatial location of the node, available bandwidth/power/processing capacity, and total available buffer storage.

Once all information has been aggregated with the Information Wayfinding system 1410, the packet routing can be accomplished. A stream function expressed as a source flow comprises a radial flow with magnitude m and reference angle $\theta$, $\Psi = m*\theta$; a stream function expressed as a sink flow comprises a radial flow with magnitude negative m and reference angle $\theta$, $\Psi = m*\theta$; a stream function expressed as a vortex flow comprises a rotational flow around a central point with magnitude $\Gamma$ and radial distance r, $\Psi = \Gamma/2*\pi*\ln(r)$; a stream function expressed as a doublet comprises a circular barrier with diameter proportional to $\kappa$, radial distance r, and reference angle $\theta$, $\Psi = -\kappa/2*\pi*\sin(\theta)/r$; and a stream function expressed as a sector flow comprises flow through a radial section with velocity A, radial distance r, reference angle $\theta$ and n parameter to be specified, $\Psi = A*r^n*\cos(n*\theta)$.

The obstacles (latency, node buffer capacity, path choice priority, bandwidth, and congestion) can be categorized according to a predefined obstacle schema. In an exemplary embodiment, an information packet can navigate one or more obstacles based on a subscription to one or more categories of the predefined obstacle schema; knowledge of one or more obstacles can be automatically pushed to an information packet or, alternatively, upon request by an information packet. The same process is applied to all available interim nodes 1410-A, 1410B, 1410-C and 1410-D.

The interim "hop" that maximizes the potential function is then selected 1415 and initiates the emission and transfer process 1420. Calculating the route of each information packet can be dynamically recalculated as an information packet travels from its source to its destination as a function of updated obstacles; the route can also be dynamically recalculated upon detecting a difference in an actual location and a planned location for an information packet. Furthermore, the method can include detecting new obstacles and, in response, recalculating the route.

Applications

There are a multitude of applications where the Information Wayfinding system has clear benefits of the current state of the art. Exemplary embodiments including the following.

Signal Intelligence (SIGINT) collection planning is the practice of collecting intelligence from a multitude of spectrums, geographic locations, platforms, and information quality for the purpose of national defense. Within SIGINT, there are a series of objectives, which have locations, and you also have the location of the collection asset which may be moving, and the collections have priorities. All elements have an urgency of time from receiving information to transmitting to its destination(s) for adjudication and action. If information is transmitted too slowly, it may no longer be relevant. It is therefore a constant balancing of what is possible, and priority.

Advanced Network Routing is the application of techniques, such as Information Wayfinding, to dynamically balance and route information within a communication network. This requires routing network patents on a TCP/IP network to avoid "compromised" networks either due to adversarial, environmental, hardware/software failure, or other forms of system degradation. Encryption is used to protect data from adversarial compromise, but with the advent of Quantum computing, encryption may be broken quickly if the scheme is not chosen well. Similarly, there are certain networks that may be compromised by adversarial countries or "hackers". Choosing to route data over trusted networks is a Information Wayfinding operation. Current status quo for this operation is handled by routing tables in a router—these are often static contingency plans for alternative routing of packets in the event of an outage or degradation. The Information Wayfinding invention would instead dynamically calculate, in real-time, alternative routing alternatives based on current "trust" information. As soon as news of a network compromise occurs, the routing tables update to avoid sending traffic through that compromised node or node area.

As small satellite (smallsat) constellations become ubiquitous (e.g Starlink, OneWeb) and commercial ground stations become more common, consumers of smallsat data will want to balance the cost of routing the data in space, the cost of various ground stations, and the cost of ground routing data. In addition to cost, there may be areas of the network that are unavailable due to solar activity/space storms or because of intentional denial of service. Speed of delivery, "obstacles" in the network, node power management, consumer satisfaction, and cost all play into a dynamic wayfinding opportunity for information. Routing of information between ground stations with smallsat nodes as intermediaries in order to maximize latency, resiliency, or operational costs is also envisioned.

REFERENCES

The following references, in addition to others identified supra, are incorporated herein by reference:
1. Currie, I. G. "Fundamental Mechanics of Fluids, Third Edition." 2003.
2. Touro's, White, and Shanmugavel, "Cooperative Path Planning of Unmanned Aerial Vehicles," Progress in Astronautics and Aeronautics, 2011.

We claim:

1. A method for automatically routing data packets in dynamic networks from an originating node to a destination node through a plurality of intermediate nodes, wherein ones of said plurality of intermediate nodes operable to be dynamically changed as each of said data packets is routed between said originating node and said destination node, comprising:
modeling at least a portion of a route for each of said data packets as a fluid dynamics potential flow characterized by an irrotational velocity field, wherein:
each of said data packets are an analogue of a flow particle, said originating node of said route is an analogue of a source, and said destination node of said route is an analogue of a sink; and
each of one or more of said plurality of intermediate nodes are associated with a stream function ($\Psi$) which adheres to a definition of irrotational and incompressible potential flow that independently represents a flow phenomenon that operable to influence said route of each of said data packets through said plurality of intermediate nodes,
dynamically calculating an optimal route of each of said data packets based on a current location at ones of said plurality of intermediate nodes and an aggregate stream function comprising a sum of each of said flow phenomena acting on each of said data packets between said current location at one of said plurality of intermediate nodes and said destination node; and
routing each of said data packets between said plurality of intermediate nodes based on said optimal route.

2. The method recited in claim 1, wherein said stream function ($\Psi$) expressed as a source flow comprises a radial flow with magnitude m and reference angle $\theta$, $\Psi = m*\theta$.

3. The method recited in claim 1, wherein said stream function ($\Psi$) expressed as a sink flow comprises a radial flow with magnitude negative m and reference angle $\theta$, $\Psi = m*\theta$.

4. The method recited in claim 1, wherein said stream function ($\Psi$) expressed as a vortex flow comprises a rotational flow around a central point with magnitude $\Gamma$ and radial distance r, $\Psi = \Gamma/2*\pi*\ln(r)$.

5. The method recited in claim 1, wherein said stream function ($\Psi$) expressed as a doublet comprises a circular barrier with diameter proportional to $\kappa$, radial distance r and reference angle $\theta$, $\Psi = -\kappa/2*\pi*\sin(\theta)/r$.

6. The method recited in claim 1, wherein said stream function ($\Psi$) expressed as a sector flow comprises flow through a radial section with velocity A and angle $\pi/n$, with radial distance r, reference angle $\theta$ and n parameter to be specified, $\Psi = A*r^n*\cos(n*\theta)$.

7. The method recited in claim 1, wherein said dynamically calculating said optimal route of each of said data packets is dynamically recalculated as each of said data packets travels from said originating node to said destination node as a function of updated information for one or more of said plurality of intermediate nodes or one or more new destination nodes.

8. The method recited in claim 7, wherein said updated information comprises a spatial location, available bandwidth, power, processing capacity or available buffer storage of at least one of said plurality of intermediate nodes.

9. The method recited in claim 1, wherein said stream function ($\Psi$) for each of said data packets is further a function of a status associated with each of said data packets.

10. The method recited in claim 9, wherein said status associated with each of said data packets is one or more of a relevance of each of said data packets, a priority of information contained in each of said data packets, a type of information contained in each of said data packets, or said destination node of each of said data packets.

11. The method recited in claim 1, wherein each of said plurality of intermediate nodes is categorized according to a predefined obstacle schema.

12. The method recited in claim 11, wherein said predefined obstacle schema comprises global obstacles, hierarchical obstacles, and local obstacles, wherein:
said global obstacles identify distinct plurality of intermediate nodes to be avoided by each of said data packets;
said hierarchical obstacles identify said plurality of intermediate nodes to be avoided by predefined classes of said data packets; and
local obstacles identify said plurality of intermediate nodes specific to an individual one of said data packets.

13. The method recited in claim 11, wherein each of said data packets receives updated information for said one or more of said plurality of intermediate nodes based on a subscription to one or more categories of said predefined obstacle schema.

14. The method recited in claim 13, wherein said updated information for said one or more of said plurality of intermediate nodes is automatically pushed to one or more other ones of said plurality of intermediate nodes.

15. The method recited in claim 1, wherein said calculating said route of each of said data packets is dynamically recalculated upon detecting a difference in an actual location and a planned location for each of said data packets.

16. The method recited in claim 1, further comprising detecting changes in said plurality of intermediate nodes and, in response, dynamically recalculating said optimal route for each of said data packets.

17. The method recited in claim 1, wherein each of said originating node, said destination node and plurality of intermediate nodes are a stationary node or a mobile node.

18. The method recited in claim 17, wherein said mobile node is associated with a satellite, an airplane or a terrestrial vehicle.

19. A system for automatically routing data packets in dynamic networks from an originating node to a destination node through a plurality of intermediate nodes, wherein ones of said plurality of intermediate nodes operable to be dynamically changed as each of said data packets is routed between said originating node and said destination node, said system operable on a processor and memory configured to:
  model at least a portion of a route for each of said data packets as a fluid dynamics potential flow characterized by an irrotational velocity field, wherein:
    each of said data packets are an analogue of a flow particle, said originating node of said route is the analogue of a source, and said destination node of said route is an analogue of a sink; and
    each of one or more of said plurality of intermediate nodes are associated with a stream function ($\Psi$) which adheres to a definition of irrotational and incompressible potential flow that independently represents a flow phenomenon that operable to influence said route of each of said data packets through said plurality of intermediate nodes;
  dynamically calculate an optimal route of each of said data packets based on a current location at ones of said plurality of intermediate nodes and an aggregate stream function comprising a sum of each of said flow phenomena acting on each of said data packets between said current location at one of said plurality of intermediate nodes and said destination node; and
  route each of said data packets between said plurality of intermediate nodes based on said optimal route.

20. The system recited in claim 19, wherein said stream function ($\Psi$) expressed as a source flow comprises a radial flow with magnitude m and reference angle $\theta$, $\Psi = m*\theta$.

21. The system recited in claim 19, wherein said stream function ($\Psi$) expressed as a sink flow comprises a radial flow with magnitude negative m and reference angle $\theta$, $\Psi = m*\theta$.

22. The system recited in claim 19, wherein said stream function ($\Psi$) expressed as a vortex flow comprises a rotational flow around a central point with magnitude $\Gamma$ and radial distance r, $\Psi = -\Gamma/2*\pi*\ln(r)$.

23. The system recited in claim 19, wherein said stream function ($\Psi$) expressed as a doublet comprises a circular barrier with diameter proportional to $\kappa$, radial distance r and reference angle $\theta$, $\Psi = -\kappa/2*\pi*\sin(\theta)/r$.

24. The system recited in claim 19, wherein said stream function ($\Psi$) expressed as a sector flow comprises flow through a radial section with velocity A and angle $\pi/n$, with radial distance r, reference angle $\theta$ and n parameter to be specified, $\Psi = A*r^n*\cos(n*\theta)$.

25. The system recited in claim 19, wherein said processor and said memory are configured to dynamically recalculate said optimal route of each of said data of said packets as each of said data packet packets travels from said originating node to said destination node as a function of updated information for one or more of said plurality of intermediate nodes or one or more new destination nodes.

26. The system recited in claim 25, wherein said updated information comprises a spatial location, available bandwidth, power, processing capacity or available buffer storage of at least one of said plurality of intermediate nodes.

27. The system recited in claim 19, wherein said stream function ($\Psi$) for each of said data packets is further a function of a status associated with each of said data packets.

28. The system recited in claim 27, wherein said status associated with each of said data packets is one or more of a relevance of each of said data packets, a priority of information contained in each of said data packets, a type of information contained in each of said data packets, or said destination node of each of said data packets.

29. The system recited in claim 19, wherein each of said plurality of intermediate nodes is categorized according to a predefined obstacle schema.

30. The system recited in claim 29, wherein said predefined obstacle schema comprises global obstacles, hierarchical obstacles, and local obstacles, wherein:
  said global obstacles identify distinct plurality of intermediate nodes to be avoided by each of said data packets;
  said hierarchical obstacles identify said plurality of intermediate nodes to be avoided by predefined classes of said data packets; and
  local obstacles identify said plurality of intermediate nodes specific to an individual one of said data packets.

31. The system recited in claim 29, wherein each of said data packets receives updated information for said one or more of said plurality of intermediate nodes based on a subscription to one or more categories of said predefined obstacle schema.

32. The system recited in claim 31, wherein said updated information for said one or more of said plurality of intermediate nodes is automatically pushed to one or more other ones of said plurality of intermediate nodes.

33. The system recited in claim 19, wherein said processor and said memory are configured to dynamically recalculate said optimal route of each of said data packets upon detecting a difference in an actual location and a planned location for each of said data packets.

34. The system recited in claim 19, wherein said processor and said memory are further configured to detect changes in said plurality of intermediate nodes and, in response, dynamically recalculate said optimal route for each of said data packets.

35. The system recited in claim 19, wherein each of said originating node, said destination node and plurality of intermediate nodes are a stationary node or a mobile node.

36. The method recited in claim 35, wherein said mobile node is associated with a satellite, an airplane or a terrestrial vehicle.

* * * * *